US012578435B2

(12) United States Patent
Cai et al.

(10) Patent No.: US 12,578,435 B2
(45) Date of Patent: Mar. 17, 2026

(54) LASER DETECTION APPARATUS, METHOD FOR MANUFACTURING LASER DETECTION APPARATUS, AND TERMINAL

(71) Applicant: Shenzhen Yinwang Intelligent Technologies Co., Ltd., Shenzhen (CN)

(72) Inventors: Zhonghua Cai, Shanghai (CN); Wei Wang, Shanghai (CN); Anliang Yu, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 896 days.

(21) Appl. No.: 17/869,544

(22) Filed: Jul. 20, 2022

(65) Prior Publication Data

US 2022/0357428 A1    Nov. 10, 2022

Related U.S. Application Data

(63) Continuation of application No. PCT/CN2021/071312, filed on Jan. 12, 2021.

(30) Foreign Application Priority Data

Jan. 21, 2020    (CN) .......................... 202010071027.5

(51) Int. Cl.
*G01C 3/08* (2006.01)
*G01S 7/481* (2006.01)
*G01S 7/4861* (2020.01)
*G01S 17/933* (2020.01)

(52) U.S. Cl.
CPC .......... *G01S 7/4815* (2013.01); *G01S 7/4861* (2013.01); *G01S 17/933* (2013.01)

(58) Field of Classification Search
CPC ..... G01S 7/4815; G01S 7/4861; G01S 17/933
See application file for complete search history.

(56) References Cited

U.S. PATENT DOCUMENTS

| | | | |
|---|---|---|---|
| 5,311,196 A | 5/1994 | Hanson et al. | |
| 5,731,790 A | 3/1998 | Riza | |
| 7,545,838 B2 * | 6/2009 | Fontanella | ......... B23K 26/0738 |
| | | | 372/15 |

(Continued)

FOREIGN PATENT DOCUMENTS

| | | |
|---|---|---|
| CN | 103227408 A | 7/2013 |
| CN | 107703517 A | 2/2018 |
| CN | 107797964 A | 3/2018 |

(Continued)

*Primary Examiner* — Mark Hellner
(74) *Attorney, Agent, or Firm* — WOMBLE BOND DICKINSON (US) LLP

(57)    ABSTRACT

This application discloses a laser detection apparatus, a method for manufacturing the laser detection apparatus, and a terminal, and belongs to the field of laser detection technologies, for example, light detection and ranging (Lidar). The apparatus includes a multiphase signal generation circuit, an amplifier array, and a laser transmitter array. The amplifier array includes a plurality of first amplifiers, and the laser transmitter array includes a plurality of laser transmitters. A plurality of output ends of the multiphase signal generation circuit are connected to input ends of corresponding first amplifiers, and output ends of the plurality of first amplifiers are connected to corresponding laser transmitters.

20 Claims, 15 Drawing Sheets

(56) References Cited

U.S. PATENT DOCUMENTS

2021/0382370 A1 * 12/2021 Di Teodoro ............ G01S 17/26

FOREIGN PATENT DOCUMENTS

| CN | 108693505 A | 10/2018 | |
|----|----|----|----|
| CN | 109716681 A | 5/2019 | |
| CN | 209487937 U | 10/2019 | |
| CN | 110456324 A | 11/2019 | |
| JP | 09211127 A * | 8/1997 | ............ G01S 17/08 |
| JP | H09211127 A | 8/1997 | |

* cited by examiner

LASER DETECTION APPARATUS, METHOD FOR MANUFACTURING LASER DETECTION APPARATUS, AND TERMINAL

CROSS-REFERENCE TO RELATED APPLICATIONS

This application is a continuation of International Application No. PCT/CN2021/071312, filed on Jan. 12, 2021, which claims priority to Chinese Patent Application No. 202010071027.5, filed on Jan. 21, 2020. The disclosures of the aforementioned applications are hereby incorporated by reference in their entireties.

TECHNICAL FIELD

This application relates to the field of laser detection technologies, and in particular, to a laser detection apparatus, a method for manufacturing the laser detection apparatus, and a terminal.

BACKGROUND

A laser detection apparatus mainly includes a signal generation circuit, a laser transmitter, and a laser detector. The signal generation circuit may generate an electrical signal, and the electrical signal may be used to drive the laser transmitter to transmit a laser signal. The laser signal may be reflected after encountering an object. In this way, the laser detector may detect a reflected signal, convert the reflected signal into an electrical signal, and output the electrical signal to the signal generation circuit, to determine a distance between the laser detection apparatus and the object.

However, because a waveform of the laser signal transmitted by the laser transmitter is simple, it needs to be ensured that a signal detected by the laser detector meets a particular signal-to-noise ratio, so that a reliable laser signal can be obtained, to ensure accuracy of a finally determined distance. In addition, because transmit power of the laser transmitter is high, impact caused by a parasitic parameter of the laser transmitter is large, resulting in a large transmit pulse width.

SUMMARY

This application provides a laser detection apparatus, a method for manufacturing the laser detection apparatus, and a terminal, to resolve a problem that accuracy of a distance detected by a laser detection apparatus is low and a transmit pulse width is large. The technical solutions are as follows.

According to a first aspect, a laser detection apparatus is provided. The laser detection apparatus includes a multiphase signal generation circuit, an amplifier array, and a laser transmitter array. The amplifier array includes a plurality of first amplifiers, the laser transmitter array includes a plurality of laser transmitters, and the plurality of first amplifiers correspond to the plurality of laser transmitters. In this case, the multiphase signal generation circuit includes a plurality of output ends corresponding to the plurality of first amplifiers, the plurality of output ends of the multiphase signal generation circuit are connected to input ends of the corresponding first amplifiers, and output ends of the plurality of first amplifiers are connected to the corresponding laser transmitters.

The multiphase signal generation circuit is configured to generate a plurality of target electrical signals with different phases. The plurality of target electrical signals with the different phases indicate that phases of any two target electrical signals are different. In other words, the plurality of target electrical signals do not include target electrical signals with a same phase. Each of the plurality of first amplifiers is configured to amplify a target electrical signal output by the corresponding output end of the multiphase signal generation circuit, and each of the plurality of laser transmitters is configured to transmit a first laser signal based on a target electrical signal amplified by the corresponding first amplifier.

It should be noted that "correspondence" in this embodiment of this application may be one-to-one, one-to-many, or many-to-one. For example, the "correspondence" in the foregoing "the plurality of first amplifiers correspond to the plurality of laser transmitters" may indicate that one first amplifier corresponds to one laser transmitter, or may indicate that one first amplifier corresponds to a plurality of laser transmitters, or may indicate that a plurality of first amplifiers correspond to one laser transmitter.

In this application, because the multiphase signal generation circuit can generate the plurality of target electrical signals with the different phases, after the first amplifiers included in the amplifier array amplify the plurality of target electrical signals, the first laser signals transmitted by the laser transmitters included in the laser transmitter array based on the amplified target electrical signals have high anti-interference performance, to improve accuracy of a distance detected by the laser detection apparatus. In addition, the laser transmitter array includes the plurality of laser transmitters, transmit power of each laser transmitter is low, and impact caused by a parasitic parameter of the laser transmitter is small. Therefore, a transmit pulse width can be reduced by transmitting laser signals by using the laser transmitter array.

It should be noted that each of the plurality of first amplifiers included in the amplifier array may receive the target electrical signal output by the connected output end of the multiphase signal generation circuit, amplify power of the target electrical signal, so that the power of the target electrical signal meets a transmit power requirement of the laser transmitter, and then, output a power-amplified target electrical signal to the connected laser transmitter.

Each of the plurality of laser transmitters included in the laser transmitter array may receive the power-amplified target electrical signal that is output by the connected first amplifier. Because the power of the target electrical signal is amplified and meets a requirement of transmitting laser by the laser transmitter, the laser transmitter may be driven by the target electrical signal to transmit the corresponding first laser signal. In this way, a plurality of first laser signals can be obtained, and all phases of the plurality of first laser signals are different. That all phases of the plurality of first laser signals are different means that both phases of any two first laser signals are different. In other words, the plurality of first laser signals do not include first laser signals with a same phase.

It should be noted that one laser transmitter may include one or more laser units, and the one or more laser units may constitute one laser transmitter. One laser unit may include three parts: an excitation source, a laser working medium, and a resonant cavity. The laser working medium may implement particle number reversal, to produce a condition for obtaining laser. The excitation source is used to excite an atomic system, so that a number of particles at an upper energy level increases, to implement the particle number reversal in the working medium. The resonant cavity may amplify laser generated after the particle number reversal, to generate strong laser and output the strong laser.

In this application, each laser transmitter in the laser transmitter array may separately transmit a first laser signal, and the first laser signals transmitted by all the laser transmitters may constitute a laser signal used for detecting a distance. In one embodiment, each laser transmitter needs to transmit only a part of power. In this way, the transmit power of each laser transmitter is reduced, to reduce the impact caused by the parasitic parameter of the laser transmitter is reduced, and to reduce the transmit pulse width.

In one embodiment, the multiphase signal generation circuit includes a digital-to-analog converter and a multiphase analog modulation circuit, and the multiphase analog modulation circuit includes a plurality of output ends corresponding to the plurality of first amplifiers. In this case, an output end of the digital-to-analog converter is connected to an input end of the multiphase analog modulation circuit, and the plurality of output ends of the multiphase analog modulation circuit are connected to input ends of the corresponding first amplifiers.

The digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

In one embodiment, the multiphase analog modulation circuit includes a plurality of analog signal generation circuits and a plurality of first comparators. The plurality of analog signal generation circuits correspond to the plurality of first comparators, and the plurality of first comparators correspond to the plurality of first amplifiers. In this case, output ends of the plurality of analog signal generation circuits are connected to first input ends of the corresponding first comparator. Second input ends of the plurality of first comparators are connected to the output end of the digital-to-analog converter. Output ends of the plurality of first comparators are connected to input ends of the corresponding first amplifiers.

Each of the plurality of analog signal generation circuits is configured to generate a second analog electrical signal, and phases of a plurality of second analog electrical signals generated by the plurality of analog signal generation circuits are different. Each of the plurality of first comparators is configured to output a target electrical signal based on an input second analog electrical signal and the first analog electrical signal, to obtain the plurality of target electrical signals with the different phases.

In an example, after receiving the second analog electrical signal and the first analog electrical signal, the first comparator may compare, based on a horizontal axis, waveforms that are of the second analog electrical signal and the first analog electrical signal at a same horizontal-axis location and that correspond to a longitudinal axis. In a waveform of the target electrical signal, a horizontal-axis interval, that is located above a waveform of the second analog electrical signal, of a waveform of the first analog electrical signal is set to a high electrical level, and a horizontal-axis interval, that is located below the waveform of the second analog electrical signal, of the waveform of the first analog electrical signal is set to a low electrical level. In one embodiment, at a same horizontal-axis location, when a value of the first analog electrical signal is greater than a value of the second analog electrical signal, the horizontal-axis location in the target electrical signal corresponds to a high electrical level, or when a value of the first analog electrical signal is not greater than a value of the second analog electrical signal, the horizontal-axis location in the target electrical signal corresponds to a low electrical level.

It should be noted that the first digital electrical signal is a discrete binary data string. Because the multiphase analog modulation circuit cannot directly modulate the first digital electrical signal, the digital-to-analog converter may convert the first digital electrical signal in a form of a discrete binary data string into a continuous first analog electrical signal, and then input the first analog electrical signal to the multiphase analog modulation circuit, so that the multiphase analog modulation circuit modulates the first analog electrical signal, to obtain the plurality of target electrical signals with the different phases. Because a process in which the multiphase analog modulation circuit obtains the target electrical signals based on the first analog electrical signal is to process an analog electrical signal, the target electrical signals obtained through processing are also continuous analog electrical signals.

In one embodiment, the multiphase signal generation circuit includes a multiphase digital modulation circuit. The multiphase digital modulation circuit includes a plurality of output ends corresponding to the plurality of first amplifiers, and the plurality of output ends of the multiphase digital modulation circuit are connected to input ends of the corresponding first amplifiers. The multiphase modulation circuit is configured to perform multiphase modulation on a first digital electrical signal, to obtain the plurality of target electrical signals with the different phases.

In one embodiment, the multiphase digital modulation circuit includes a plurality of digital signal generation circuits and a plurality of second comparators. The plurality of digital signal generation circuits correspond to the plurality of second comparators, and the plurality of second comparators correspond to the plurality of first amplifiers. In this case, output ends of the plurality of digital signal generation circuits are connected to first input ends of the corresponding second comparators, output ends of the plurality of second comparators are connected to input ends of the corresponding first amplifiers, and second input ends of the plurality of second comparators are configured to input the first digital electrical signal.

Each of the plurality of digital signal generation circuits is configured to generate a second digital electrical signal. Phases of a plurality of second digital electrical signals generated by the plurality of digital signal generation circuits are different. Each of the plurality of second comparators is configured to output a target electrical signal based on an input second digital electrical signal and the first digital electrical signal, to obtain the plurality of target electrical signals with the different phases.

It should be noted that the first comparators are configured to generate the target electrical signals based on waveforms of the continuous first analog electrical signal and the second analog electrical signals, and the second comparators generate the target electrical signals based on the first digital electrical signal in a form of a discrete binary data string and the second digital electrical signals. In this case, binary data being 1 corresponds to a high electrical level, and binary data being 0 corresponds to a low electrical level. In this way, at a same horizontal-axis location, when the first digital electrical signal corresponds to a high electrical level and the second digital electrical signal corresponds to a low electrical level, a corresponding horizontal-axis location in the target electrical signal is of a high electrical level. When the first digital electrical signal corresponds to a low electrical level and the second digital electrical signal corresponds to a high electrical level, a corresponding horizontal-axis location in the target electrical signal is of a low electrical level.

It should be noted that, because the multiphase digital modulation circuit can directly modulate the first digital electrical signal, the multiphase digital modulation circuit can directly receive the first digital electrical signal, and perform multiphase modulation on the first digital electrical signal in the form of the discrete binary data string, to obtain the plurality of target electrical signals with the different phases. Because a process in which the multiphase digital modulation circuit obtains the target electrical signals based on the first digital electrical signal is to process a digital electrical signal, the target electrical signals obtained through processing are also digital electrical signals in the form of the discrete binary data string.

In one embodiment, the laser detection apparatus further includes a laser detector and a second amplifier. In this case, an output end of the laser detector is connected to an input end of the second amplifier, and the laser detector is configured to: detect a second laser signal, convert the second laser signal into a third analog electrical signal, and output the third analog electrical signal to the second amplifier.

It should be noted that, after each laser transmitter included in the laser transmitter array separately transmits a first laser signal, the plurality of laser transmitters transmit a plurality of first laser signals in total. Due to an aggregation feature of light, after encountering an object, the plurality of first laser signals are aggregated to form a second laser signal. Then, the laser detector can detect the second laser signal, and convert the second laser signal into the third analog electrical signal.

It should be noted that, because the second amplifier connected to the laser detector is configured to amplify power of an analog electrical signal, the laser detector can convert the second laser signal into the third analog electrical signal after detecting the second laser signal, so that the analog-to-digital converter can amplify power of the third analog electrical signal.

In one embodiment, detection bandwidth of the laser detector may be greater than transmit bandwidth of the target electrical signal. In this way, an original signal can be restored from the second laser signal detected by the laser detector. For example, the detection bandwidth of the laser detector may be 2 to 5 times the transmit bandwidth of the target electrical signal.

In one embodiment, the second amplifier has particular signal passing bandwidth. The signal passing bandwidth refers to bandwidth of an analog electrical signal that can be transmitted by using the second amplifier and whose power can be amplified by the second amplifier. In other words, only an analog electrical signal within the signal passing bandwidth can be transmitted by using the second amplifier, and the second amplifier can perform power amplification on the analog electrical signal within the signal passing bandwidth. In this way, the original signal can be restored after the second amplifier amplifies the power of the third analog electrical signal. For example, the signal passing bandwidth of the second amplifier may be 2 to 5 times the transmit bandwidth of the target electrical signal.

In this application, although the first laser signals transmitted by the laser transmitters have high-speed pulse waveforms, envelope bandwidth of the second laser signal received by the laser detector is not high. Therefore, difficulty in converting the second laser signal into the third analog electrical signal by the laser detector is reduced.

In one embodiment, the laser detection apparatus further includes an analog-to-digital converter and a baseband processor. In this case, an input end of the analog-to-digital converter is connected to an output end of the second amplifier, an output end of the analog-to-digital converter is connected to an input end of the baseband processor, and an output end of the baseband processor is connected to an input end of the multiphase signal generation circuit.

The analog-to-digital converter is configured to convert the third analog electrical signal into a third digital electrical signal, and output the third digital electrical signal to the baseband processor. The baseband processor is configured to generate a first digital electrical signal, and output the first digital electrical signal to the multiphase signal generation circuit, and is further configured to detect a distance based on the first digital electrical signal and the third digital electrical signal.

It should be noted that the baseband processor cannot directly process a continuous analog electrical signal, but can process only a digital electrical signal in a form of a discrete binary data string. Therefore, the analog-to-digital converter needs to discretize the third analog electrical signal into the third digital electrical signal, and then output the third digital electrical signal to the baseband processor.

In an example, the baseband processor may obtain a moment at which the first digital electrical signal starts to be output and a moment at which the third digital electrical signal starts to be received, and determine a first time difference between the two moments. Duration within which the multiphase signal generation circuit generates the plurality of target electrical signals through modulation, duration within which the amplifier array amplifies the plurality of target electrical signals, duration within which the plurality of target electrical signals drive the transmitter array to transmit the first laser signals, duration within which the laser detector converts the second laser signal into the third analog electrical signal, duration within which the second amplifier amplifies the third analog electrical signal, and duration within which the analog-to-digital converter converts the third analog electrical signal into the third digital electrical signal are all constant. Therefore, the baseband processor can subtract the constant duration, that is consumed by the processing by these circuits, from the first time difference. In this way, a second time difference between a moment at which the first laser signals are transmitted by the laser transmitters and a moment at which the first laser signals are received by the laser detector can be obtained. Then, the baseband processor can determine a distance between the laser detection apparatus and the object based on the second time difference.

It should be noted that the baseband processor may further demodulate the received third digital electrical signal. Because the first digital electrical signal and the third digital electrical signal are coherent signals, when demodulating the third digital electrical signal, the baseband processor can obtain a coherent carrier based on the first digital electrical signal, and perform coherent demodulation on the third digital electrical signal based on the coherent carrier. In this way, a coherent gain can be obtained, to improve anti-interference performance and improve accuracy of a detected distance. The coherent signals are signals that have a same vibration direction, a same frequency, and a same phase or phase difference.

In one embodiment, the laser detection apparatus further includes a low-pass filter. In this case, the low-pass filter is connected in series between the laser detector and the second amplifier, or is connected in series between the second amplifier and the analog-to-digital converter.

It should be noted that, because the nature includes various interfering signals, the second laser signal may be interfered in the nature. Consequently, the second laser signal detected by the laser detector includes an interfering signal, and the third analog electrical signal converted based on the second laser signal also includes the interfering signal. To enable the baseband processor to obtain a more accurate third digital electrical signal, before the third digital electrical signal is input into the baseband processor, the third digital electrical signal or the third analog electrical signal may be filtered, to filter out an interfering signal included in the third digital electrical signal or the third analog electrical signal. The low-pass filter may be any filter that can be configured to filter out the interfering signal included in the third analog electrical signal or the third digital electrical signal. This is not limited in this application.

According to a second aspect, a method for manufacturing a laser detection apparatus is provided. The laser detection apparatus includes a multiphase signal generation circuit, an amplifier array, and a laser transmitter array. The amplifier array includes a plurality of first amplifiers, and the laser transmitter array includes a plurality of laser transmitters. The plurality of first amplifiers correspond to the plurality of laser transmitters. The multiphase signal generation circuit includes a plurality of output ends corresponding to the plurality of first amplifiers. In this case, the plurality of output ends of the multiphase signal generation circuit may be connected to input ends of the corresponding first amplifiers, and output ends of the plurality of first amplifiers may be connected to the corresponding laser transmitters.

The multiphase signal generation circuit is configured to generate a plurality of target electrical signals with different phases, each of the plurality of first amplifiers is configured to amplify a target electrical signal output by the corresponding output end of the multiphase signal generation circuit, and each of the plurality of laser transmitters is configured to transmit a first laser signal based on a target electrical signal amplified by the corresponding first amplifier.

In one embodiment, the multiphase signal generation circuit includes a digital-to-analog converter and a multiphase analog modulation circuit, and the multiphase analog modulation circuit includes a plurality of output ends corresponding to the plurality of first amplifiers. In this case, an output end of the digital-to-analog converter may be connected to an input end of the multiphase analog modulation circuit, and the plurality of output ends of the multiphase analog modulation circuit may be connected to input ends of the corresponding first amplifiers.

The digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

In one embodiment, the multiphase analog modulation circuit includes a plurality of analog signal generation circuits and a plurality of first comparators. The plurality of analog signal generation circuits correspond to the plurality of first comparators, and the plurality of first comparators correspond to the plurality of first amplifiers. In this case, the output end of the digital-to-analog converter may be connected to second input ends of the plurality of first comparators, first input ends of the plurality of first comparators may be connected to output ends of the corresponding analog signal generation circuits, and output ends of the plurality of first comparators may be connected to input ends of the corresponding first amplifiers.

Each of the plurality of analog signal generation circuits is configured to generate a second analog electrical signal, and phases of a plurality of second analog electrical signals generated by the plurality of analog signal generation circuits are different. Each of the plurality of first comparators is configured to output a target electrical signal based on an input second analog electrical signal and the first analog electrical signal, to obtain the plurality of target electrical signals with the different phases.

In one embodiment, the multiphase signal generation circuit includes a multiphase digital modulation circuit, and the multiphase digital modulation circuit includes a plurality of output ends corresponding to the plurality of first amplifiers. In this case, the plurality of output ends of the multiphase digital modulation circuit may be connected to input ends of the corresponding first amplifiers. The multiphase modulation circuit is configured to perform multiphase modulation on a first digital electrical signal, to obtain the plurality of target electrical signals with the different phases.

In one embodiment, the multiphase digital modulation circuit includes a plurality of digital signal generation circuits and a plurality of second comparators. The plurality of digital signal generation circuits correspond to the plurality of second comparators, and the plurality of second comparators correspond to the plurality of first amplifiers. In this case, output ends of the plurality of digital signal generation circuits may be connected to first input ends of the corresponding second comparators, and output ends of the plurality of second comparators may be connected to input ends of the corresponding first amplifiers.

Second input ends of the plurality of second comparators are configured to input the first digital electrical signal. Each of the plurality of digital signal generation circuits is configured to generate a second digital electrical signal, and phases of a plurality of second digital electrical signals generated by the plurality of digital signal generation circuits are different. Each of the plurality of second comparators is configured to output a target electrical signal based on an input second digital electrical signal and the first digital electrical signal, to obtain the plurality of target electrical signals with the different phases.

In one embodiment, the laser detection apparatus further includes a laser detector and a second amplifier. In this case, an output end of the laser detector may be connected to an input end of the second amplifier. The laser detector is configured to: detect a second laser signal, convert the second laser signal into a third analog electrical signal, and output the third analog electrical signal to the second amplifier.

In one embodiment, the laser detection apparatus further includes an analog-to-digital converter and a baseband processor. In this case, an input end of the analog-to-digital converter may be connected to an output end of the second amplifier, an output end of the analog-to-digital converter may be connected to an input end of the baseband processor, and an output end of the baseband processor may be connected to an input end of the multiphase signal generation circuit.

The analog-to-digital converter is configured to convert the third analog electrical signal into a third digital electrical signal, and output the third digital electrical signal to the baseband processor. The baseband processor is configured to generate a first digital electrical signal, and output the first digital electrical signal to the multiphase signal generation circuit, and is further configured to detect a distance based on the first digital electrical signal and the third digital electrical signal.

In one embodiment, the laser detection apparatus further includes a low-pass filter. In this case, the low-pass filter may be connected in series between the laser detector and the second amplifier, or the low-pass filter may be connected in series between the second amplifier and the analog-to-digital converter.

According to a third aspect, a terminal is provided. The terminal includes the laser detection apparatus according to the first aspect. In one embodiment, the terminal is a vehicle or an uncrewed aerial vehicle device.

The technical solutions provided in this application can bring at least the following beneficial effects.

In this application, because the multiphase signal generation circuit can generate the plurality of target electrical signals with the different phases, after the first amplifiers included in the amplifier array amplify the plurality of target electrical signals, the first laser signals transmitted by the laser transmitters included in the laser transmitter array based on the amplified target electrical signals have high anti-interference performance, to improve the accuracy of the distance detected by the laser detection apparatus. In addition, the laser transmitter array includes the plurality of laser transmitters, the transmit power of each laser transmitter is low, and impact caused by a parasitic parameter of the laser transmitter is small. Therefore, the transmit pulse width can be reduced by transmitting the laser signals by using the laser transmitter array.

DESCRIPTION OF EMBODIMENTS

Figure 1:
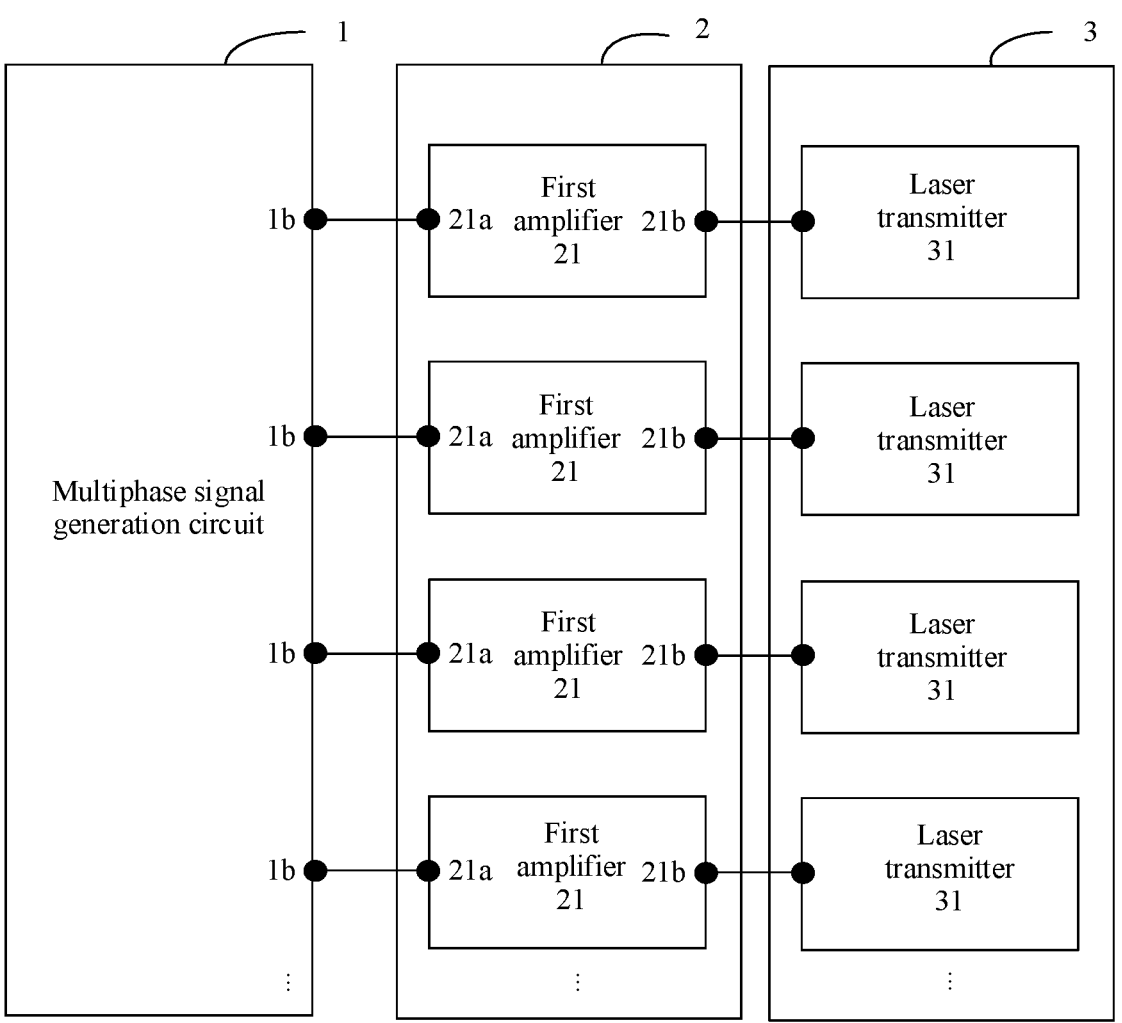
FIG. 1 is a schematic diagram of a structure of a first-type laser detection apparatus according to an embodiment of this application.

To make objectives, technical solutions, and advantages of this application clearer, the following further describes embodiments of this application in detail with reference to the accompanying drawings.

Before embodiments of this application are described in detail, application scenarios in embodiments of this application are described first.

Currently, in many scenarios, a laser detection apparatus may be installed to detect a distance. The laser detection apparatus may include a laser transmitter and a laser detector. The laser transmitter can transmit a laser signal under driving of an electrical signal, and the laser signal is reflected after encountering an object. The laser detector can detect a reflected signal. In this way, the laser detection apparatus can detect duration from transmitting the laser signal to detecting the reflected signal, to calculate a distance between the laser detection apparatus and the object based on the duration. However, a waveform of the laser signal transmitted by the laser transmitter is simple. Consequently, it is difficult for the laser detection apparatus to obtain a reliable reflected signal, resulting in low accuracy of the determined distance. In addition, transmit power of the laser transmitter is high, resulting in a large transmit pulse width. Therefore, according to a method provided in an embodiment of this application, multiphase modulation may be performed on a generated electrical signal, to obtain a plurality of target electrical signals with different phases. The plurality of target electrical signals are amplified by an amplifier array, and then may separately drive laser transmitters in a laser transmitter array to transmit laser signals. The plurality of target electrical signals with the different phases indicate that phases of any two target electrical signals are different. In other words, the plurality of target electrical signals do not include target electrical signals with a same phase. Because the plurality of target electrical signals with the different phases may be combined into a complex modulation signal, after the laser transmitters in the laser transmitter array are driven by using the plurality of target electrical signals, to send the laser signals, anti-interference performance of the laser signals can be improved. In addition, the laser transmitter array includes a plurality of laser transmitters, and transmit power of the plurality of laser transmitters is low. As a result, impact caused by parasitic parameters of the laser transmitters is small, to reduce a transmit pulse width.

For example, the laser detection apparatus may be installed on a vehicle having a self-driving mode. In this way, in a running process of a self-driving vehicle, the laser transmitters may transmit the laser signals, and the laser detector may detect a reflected signal. The laser detection apparatus may detect duration from transmitting the laser signals to detecting the reflected signal, to determine a distance between the laser detection apparatus and an object, namely, a distance between the self-driving vehicle and the object. When the distance is too small, a reminder may be further provided. However, a waveform of the laser signal transmitted by the laser transmitter is simple. Consequently, it is difficult for the laser detection apparatus to obtain a reliable reflected signal, resulting in low accuracy of the determined distance, further resulting in low accuracy of an alarm. Therefore, according to the method provided in this embodiment of this application, multiphase modulation may be performed on a generated electrical signal, to obtain a plurality of target electrical signals. The plurality of target electrical signals are amplified by the amplifier array, and then may separately drive the laser transmitters in the laser transmitter array to transmit the laser signals, to improve anti-interference performance of the laser signals, and improve the accuracy of the alarm.

For another example, the laser detection apparatus may be installed on an uncrewed aerial vehicle. In this way, in a flight process of the uncrewed aerial vehicle, the laser transmitters may transmit the laser signals, and the laser detector may detect a reflected signal. The laser detection apparatus may detect duration from transmitting the laser signals to detecting the reflected signal, to determine a distance between the laser detection apparatus and an object, namely, a distance between the uncrewed aerial vehicle and the object. When the uncrewed aerial vehicle enters a dangerous area, an alarm can be generated for the uncrewed aerial vehicle. However, a waveform of the laser signal transmitted by the laser transmitter is simple. Consequently, it is difficult for the laser detection apparatus to obtain a reliable reflected signal, resulting in low accuracy of the determined distance, and further resulting in low accuracy of the alarm. Therefore, according to the method provided in this embodiment of this application, multiphase modulation may be performed on a generated electrical signal, to obtain a plurality of target electrical signals. The plurality of target electrical signals are amplified by the amplifier array, and then may separately drive the laser transmitters in the laser transmitter array to transmit the laser signals, to improve anti-interference performance of the laser signals, and improve the accuracy of the alarm.

The following describes a structure of a laser detection apparatus provided in embodiments of this application. "Correspondence" in embodiments of this application may be one-to-one, one-to-many, or many-to-one. For example, "correspondence" in the following "a plurality of first amplifiers correspond to a plurality of laser transmitters" may indicate that one first amplifier corresponds to one laser transmitter, or may indicate that one first amplifier corresponds to a plurality of laser transmitters, or may indicate that a plurality of first amplifiers correspond to one laser transmitter.

FIG. 1 is a schematic diagram of a laser detection apparatus according to an embodiment of this application. As shown in FIG. 1, the laser detection apparatus includes a multiphase signal generation circuit 1, an amplifier array 2, and a laser transmitter array 3. The amplifier array 2 includes a plurality of first amplifiers 21, the laser transmitter array 3 includes a plurality of laser transmitters 31, and the plurality of first amplifiers 21 correspond to the plurality of laser transmitters 31.

The multiphase signal generation circuit 1 includes a plurality of output ends 1b corresponding to the plurality of first amplifiers 21, the plurality of output ends 1b of the multiphase signal generation circuit 1 are connected to input ends 21a of the corresponding first amplifiers 21, and output ends 21b of the plurality of first amplifiers 21 are connected to the corresponding laser transmitter 31. The multiphase signal generation circuit 1 is configured to generate a plurality of target electrical signals with different phases. Each first amplifier 21 of the plurality of first amplifiers 21 is configured to amplify a target electrical signal output by the corresponding output end 1b of the multiphase signal generation circuit 1, and each laser transmitter 31 of the plurality of laser transmitters 31 is configured to transmit a first laser signal based on a target electrical signal amplified by the corresponding first amplifier 21.

In this embodiment of this application, each first amplifier 21 of the plurality of first amplifiers 21 included in the amplifier array 2 may receive a target electrical signal output by the connected output end 1b of the multiphase signal generation circuit 1, and amplify power of the target electrical signal, so that the power of the target electrical signal meets a transmit power requirement of the laser transmitter 31, and then, output a power-amplified target electrical signal to the connected laser transmitter 31.

Each laser transmitter 31 of the plurality of laser transmitters 31 included in the laser transmitter array 3 may receive the power-amplified target electrical signal that is output by the connected first amplifier 21. Because the power of the target electrical signal is amplified and meets a requirement of transmitting laser by the laser transmitter 31, the laser transmitter 31 may be driven by the target electrical signal to transmit the corresponding first laser signal. In this way, a plurality of first laser signals can be obtained, and all phases of the plurality of first laser signals are different. That all phases of the plurality of first laser signals are different means that phases of any two first laser signals are different. In other words, the plurality of first laser signals do not include first laser signals with a same phase.

Figure 2:
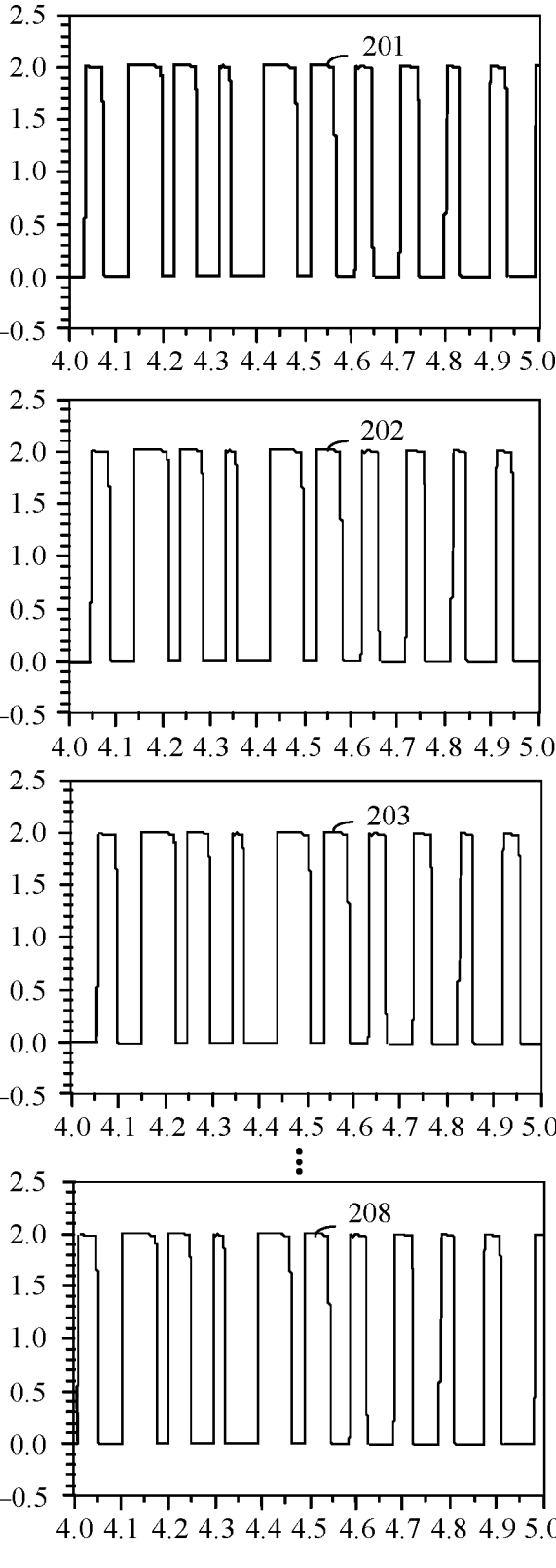
FIG. 2 is a schematic diagram of a plurality of first laser signals according to an embodiment of this application.

For example, the laser transmitter 31 transmits eight first laser signals, and some of the eight first laser signals may be shown in FIG. 2. A phase of a first laser signal 201 is 0 degrees, a phase of a first laser signal 202 is 45 degrees, a phase of a first laser signal 203 is 90 degrees, . . . , and a phase of a first laser signal 208 is 315 degrees, that is, a phase difference between every two adjacent first laser signals is 45 degrees.

It should be noted that one laser transmitter 31 may include one or more laser units, and the one or more laser units may constitute one laser transmitter 31. One laser unit may include three parts: an excitation source, a laser working medium, and a resonant cavity. The laser working medium may implement particle number reversal, to produce a condition for obtaining laser. The excitation source is used to excite an atomic system, so that a number of particles at an upper energy level increases, to implement the particle number reversal in the working medium. The resonant cavity may amplify laser generated after the particle number reversal, to generate strong laser and output the strong laser.

In one embodiment, in FIG. 1, an example in which the amplifier array 2 includes four first amplifiers 21, the laser transmitter array 3 includes four laser transmitters 31, and output ends 21b of the first amplifiers 21 are connected to input ends 31a of the laser transmitters 31 in a one-to-one correspondence is used for description. Certainly, in another possible case, the amplifier array 2 may alternatively include more or fewer first amplifiers 21, the laser transmitter array 3 may alternatively include more or fewer laser transmitters 31, and a quantity of first amplifiers 21 included in the amplifier array 2 may be different from a quantity of laser transmitters 31 included in the laser transmitter array 3. In this case, the output ends 21b of the plurality of first amplifiers 21 may not be connected to the input ends 31a of the laser transmitters 31 in a one-to-one correspondence. In other words, the output ends 21b of the plurality of first amplifiers 21 may be connected to the input end 31a of a same laser transmitter 31. This is not limited in this embodiment of this application.

In this embodiment of this application, each laser transmitter 31 of the laser transmitter array 3 may transmit a first laser signal, and the first laser signals transmitted by all the laser transmitters 31 may constitute a laser signal used for detecting a distance. In one embodiment, each laser transmitter 31 needs to transmit only a part of power. In this way, transmit power of each laser transmitter 31 is reduced, impact caused by a parasitic parameter of the laser transmitter 31 is reduced, and then a transmit pulse width is reduced.

It should be noted that the multiphase signal generation circuit 1 may be implemented by using a digital circuit, or may be implemented by using an analog circuit. The following separately describes the two different cases.

Figure 3:
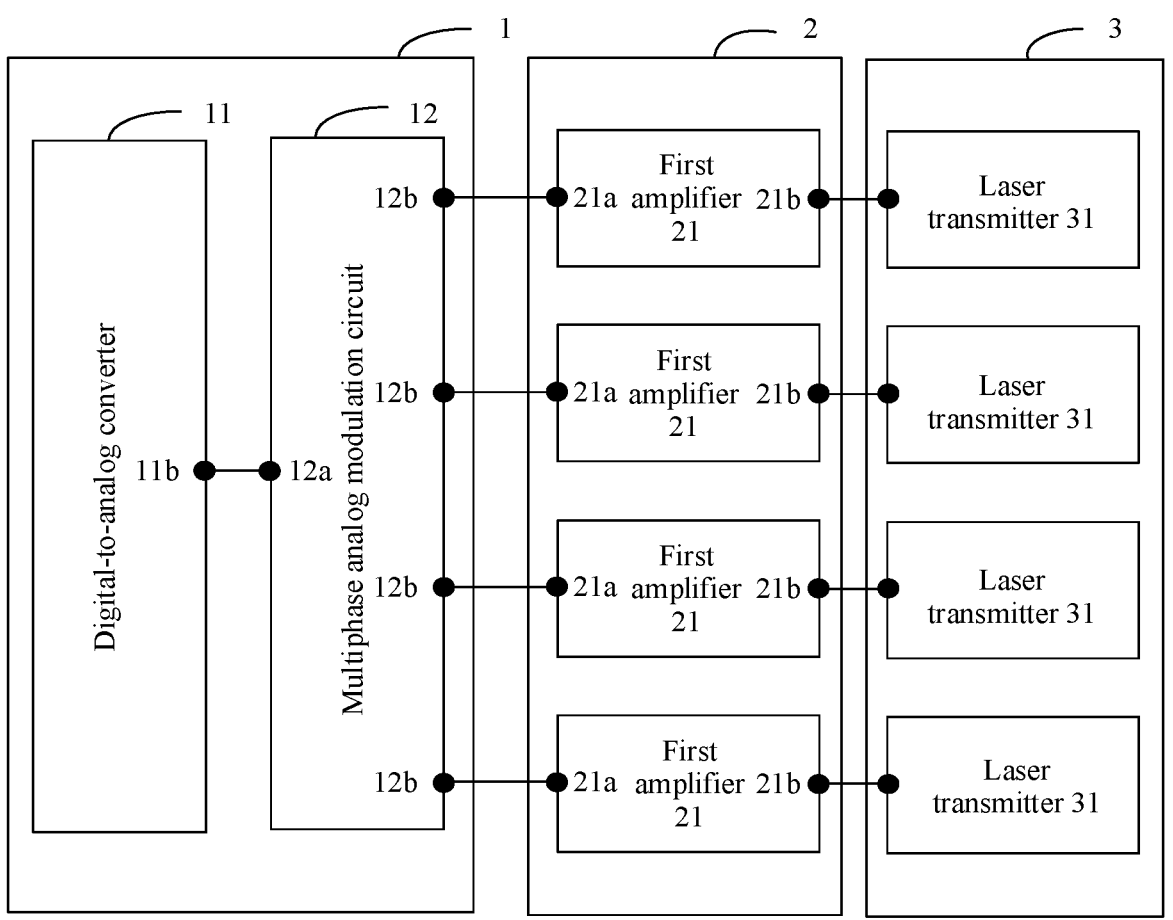
FIG. 3 is a schematic diagram of a structure of a second-type laser detection apparatus according to an embodiment of this application.

In a possible case, the multiphase signal generation circuit 1 is implemented by using an analog circuit. In this case, as shown in FIG. 3, the multiphase signal generation circuit 1 may include a digital-to-analog converter 11 and a multiphase analog modulation circuit 12, and the multiphase analog modulation circuit 12 includes a plurality of output ends 12b corresponding to the plurality of first amplifiers 21. An output end 11b of the digital-to-analog converter 11 is connected to an input end 12a of the multiphase analog modulation circuit 12. The plurality of output ends 12b of the multiphase analog modulation circuit 12 are connected to input ends 21a of the corresponding first amplifiers 21. The digital-to-analog converter 11 is configured to convert a first digital electrical signal into a first analog electrical signal. The multiphase analog modulation circuit 12 is configured to perform multiphase modulation on the first analog electrical signal, to obtain the plurality of target electrical signals with the different phases.

The first digital electrical signal is a digital electrical signal having particular feature information. For example, the feature information may be a particular phase, a particular frequency, or a particular amplitude. The plurality of target electrical signals with the different phases indicate that both phases of every two target electrical signals of the plurality of target electrical signals are different. In other words, the plurality of target electrical signals do not include target electrical signals with a same phase.

Figure 4:
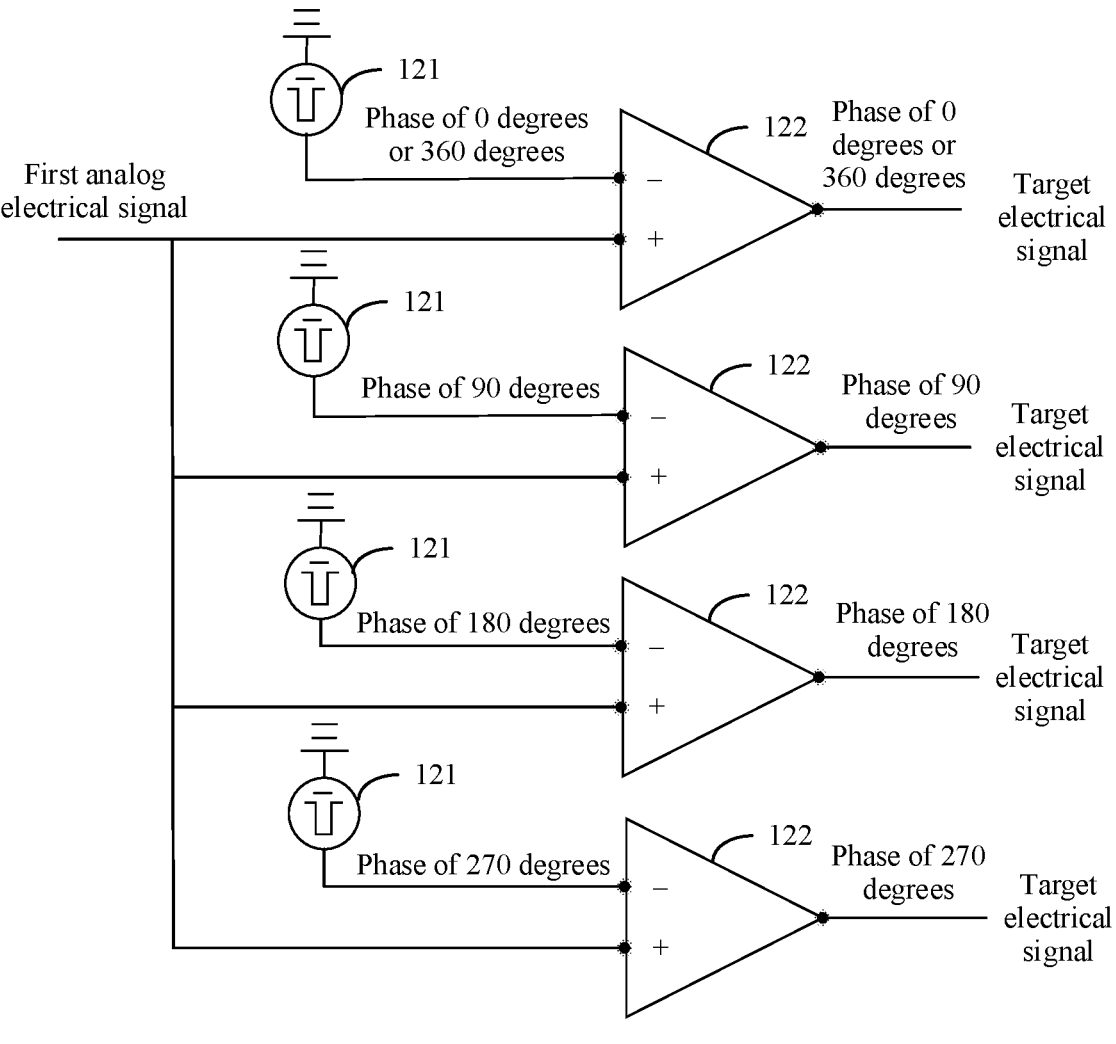
FIG. 4 is a schematic diagram of a structure of a multiphase analog modulation circuit according to an embodiment of this application.

In this embodiment of this application, as shown in FIG. 4, the multiphase analog modulation circuit 12 may include a plurality of analog signal generation circuits 121 and a plurality of first comparators 122. The plurality of analog signal generation circuits 121 correspond to the plurality of first comparators 122, and the plurality of first comparators 122 correspond to the plurality of first amplifiers 21. Output ends of the plurality of analog signal generation circuits 121 are connected to first input ends of the corresponding first comparator 122. Second input ends of the plurality of first comparators 122 are connected to the output end 11b of the digital-to-analog converter 11. Output ends of the plurality of first comparators 122 are connected to input ends 21a of the corresponding first amplifiers 21. Each analog signal generation circuit 121 of the plurality of analog signal generation circuits 121 is configured to generate a second analog electrical signal. Phases of a plurality of second analog electrical signals generated by the plurality of analog signal generation circuits 121 are different. Each first comparator 122 of the plurality of first comparators 122 is configured to output a target electrical signal based on an input second analog electrical signal and the first analog electrical signal, to obtain the plurality of target electrical signals with the different phases.

It should be noted that, because the digital-to-analog converter 11 outputs the first analog electrical signal, in FIG. 4, the first analog electrical signal is used to represent the digital-to-analog converter 11, and the digital-to-analog converter 11 is not shown in FIG. 4. In addition, in FIG. 4, an example in which the multiphase analog modulation circuit includes four analog signal generation circuits and four first comparators is used for description. In actual application, the multiphase analog modulation circuit may alternatively include more or fewer analog signal generation circuits and more or fewer first comparators. This is not limited in this embodiment of this application.

For example, as shown in FIG. 4, the multiphase analog modulation circuit 12 includes four first comparators 122 and four analog signal generation circuits 121. One analog signal generation circuit 121 of the four analog signal generation circuits 121 is configured to generate a second analog electrical signal whose phase is 0 degrees or 360 degrees. One analog signal generation circuit 121 is configured to generate a second analog electrical signal whose phase is 90 degrees. One analog signal generation circuit 121 is configured to generate a second analog electrical signal whose phase is 180 degrees. One analog signal generation circuit 121 is configured to generate a second analog electrical signal whose phase is 270 degrees. One first comparator 122 of the four first comparators 122 may output, based on the input second analog electrical signal whose phase is 0 degrees or 360 degrees and the first analog electrical signal, a target electrical signal whose phase is 0 degrees. One first comparator 122 may output, based on the input second analog electrical signal whose phase is 90 degrees and the first analog electrical signal, a target electrical signal whose phase is 90 degrees. One first comparator 122 may output, based on the input second analog electrical signal whose phase is 180 degrees and the first analog electrical signal, a target electrical signal whose phase is 180 degrees. One first comparator 122 may output, based on the input second analog electrical signal whose phase is 270 degrees and the first analog electrical signal, a target electrical signal whose phase is 270 degrees.

In an example, after receiving the second analog electrical signal and the first analog electrical signal, the first comparator 122 may compare, based on a horizontal axis, waveforms that are of the second analog electrical signal and the first analog electrical signal at a same horizontal-axis location and that correspond to a longitudinal axis. In a waveform of the target electrical signal, a horizontal axis interval, that is located above a waveform of a second analog electrical signal, of a waveform of the first analog electrical signal is set to a high electrical level, and a horizontal axis interval, that is located below the waveform of the second analog electrical signal, of the waveform of the first analog electrical signal is set to a low electrical level. In one embodiment, at a same horizontal-axis location, when a value of the first analog electrical signal is greater than a value of the second analog electrical signal, the horizontal-axis location in the target electrical signal corresponds to a high electrical level, or when a value of the first analog electrical signal is not greater than a value of the second analog electrical signal, the horizontal-axis location in the target electrical signal corresponds to a low electrical level.

Figure 5:
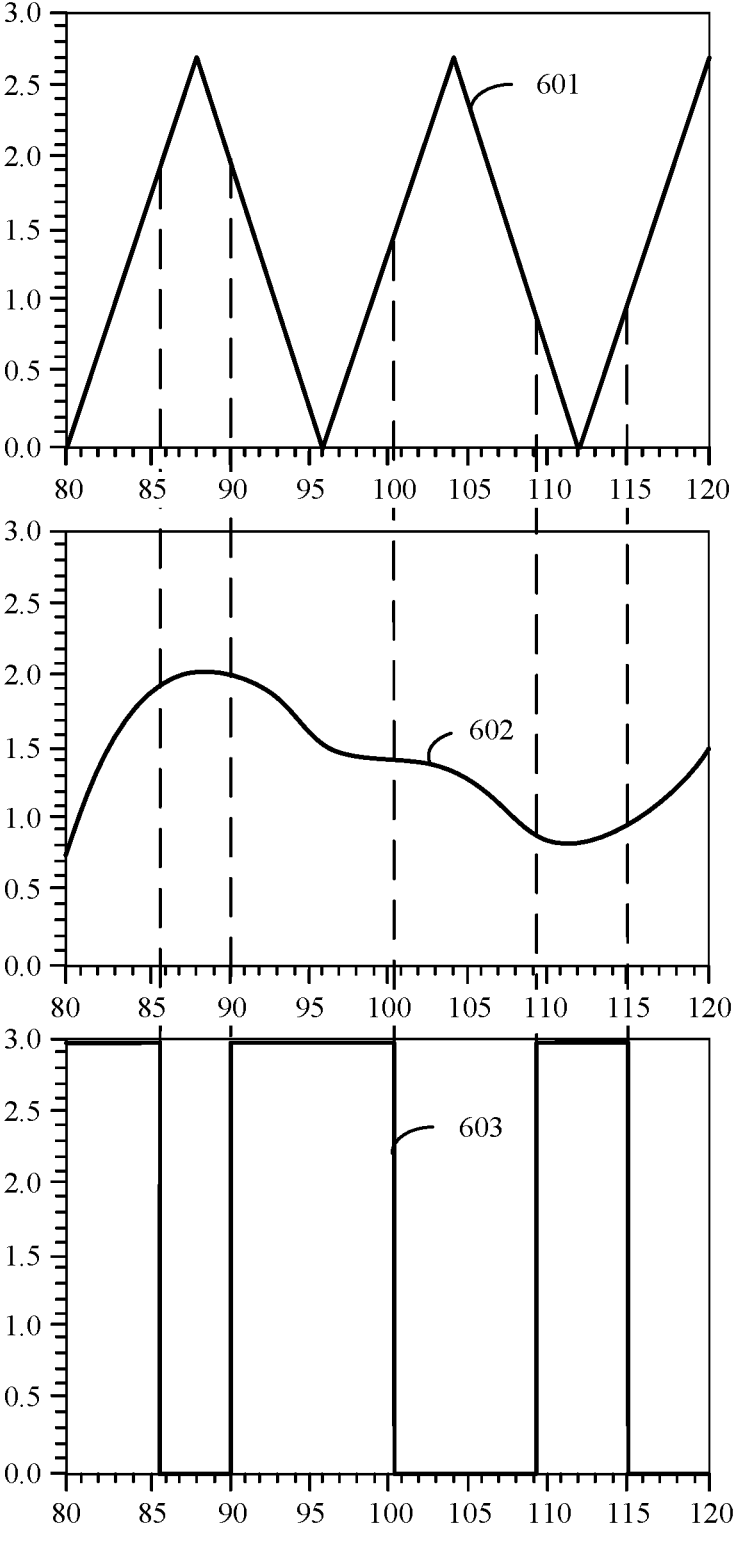
FIG. 5 is a schematic diagram in which a target electrical signal is generated according to an embodiment of this application.

For example, as shown in FIG. 5, the analog signal generation circuit 121 generates a second analog electrical signal 601, the digital-to-analog converter outputs a first analog electrical signal 602, and the first comparator 122 may output a target electrical signal 603 based on the second analog electrical signal 601 and the first analog electrical signal 602.

It should be noted that the first digital electrical signal is a discrete binary data string. Because the multiphase analog modulation circuit 12 cannot directly modulate the first digital electrical signal, the digital-to-analog converter 11 may convert the first digital electrical signal in a form of a discrete binary data string into a continuous first analog electrical signal, and then input the first analog electrical signal into the multiphase analog modulation circuit 12, so that the multiphase analog modulation circuit 12 modulates the first analog electrical signal, to obtain the plurality of target electrical signals with the different phases. Because a process in which the multiphase analog modulation circuit 12 obtains the target electrical signals based on the first analog electrical signal is to process an analog electrical signal, the target electrical signals obtained through processing are also continuous analog electrical signals.

In one embodiment, based on the same reason described above, a quantity of the plurality of output ends 12*b* of the multiphase analog modulation circuit 12 may be different from a quantity of the plurality of first amplifiers 21 included in the amplifier array 2. In this case, the plurality of output ends 12*b* of the multiphase analog modulation circuit 12 may be connected to an input end 21*a* of a same first amplifier 21.

Figure 6:
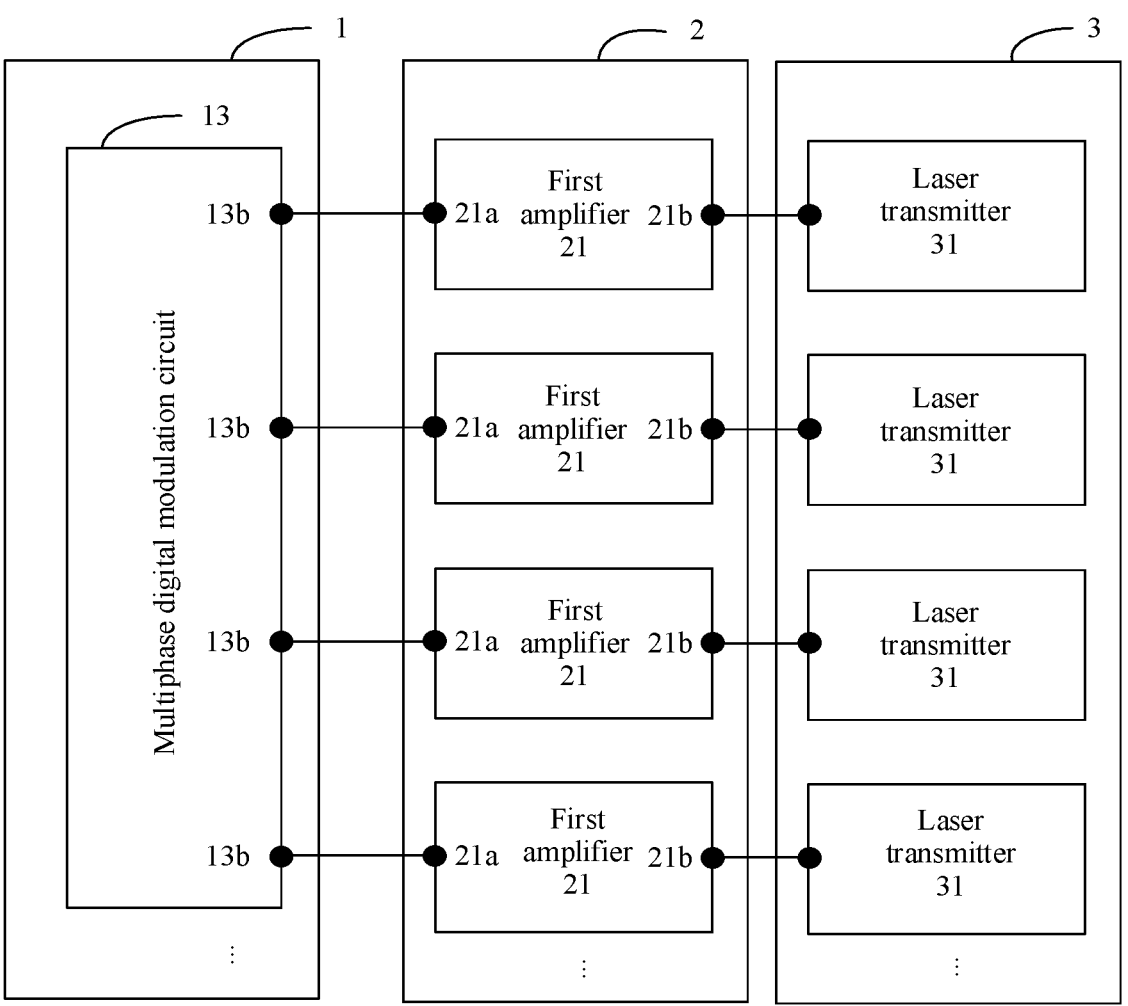
FIG. 6 is a schematic diagram of a structure of a third-type laser detection apparatus according to an embodiment of this application.

In another possible case, the multiphase signal generation circuit 1 is implemented by using a digital circuit. In this case, as shown in FIG. 6, the multiphase signal generation circuit 1 may include a multiphase digital modulation circuit 13. The multiphase digital modulation circuit 13 includes a plurality of output ends 13*b* corresponding to the plurality of first amplifiers 21. The plurality of output ends 13*b* of the multiphase digital modulation circuit 13 are connected to input ends 21*b* of the corresponding first amplifiers 21. The multiphase digital modulation circuit 13 is configured to perform multiphase modulation on a first digital electrical signal, to obtain the plurality of target electrical signals with the different phases.

Figure 7:
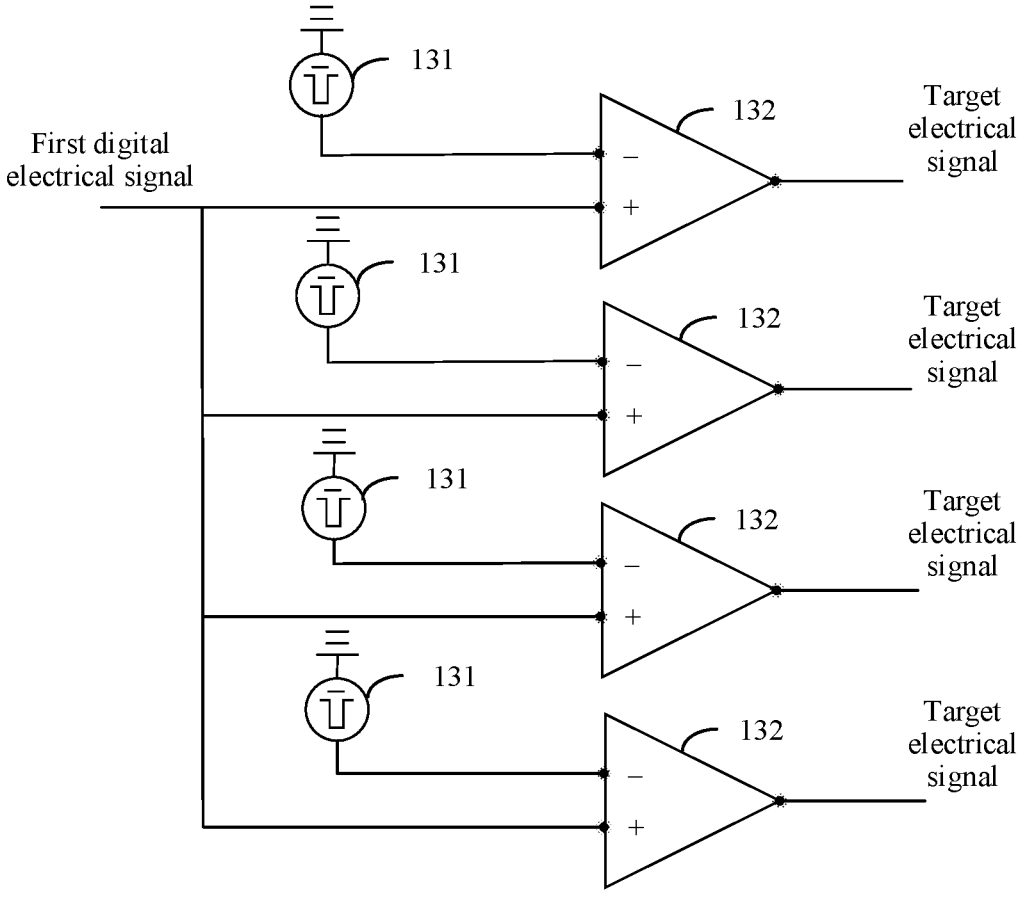
FIG. 7 is a schematic diagram of a structure of a multiphase digital modulation circuit according to an embodiment of this application.

As shown in FIG. 7, the multiphase digital modulation circuit 13 may include a plurality of digital signal generation circuits 131 and a plurality of second comparators 132. The plurality of digital signal generation circuits 131 correspond to the plurality of second comparators 132, and the plurality of second comparators 132 correspond to the plurality of first amplifiers 21. Output ends of the plurality of digital signal generation circuits 131 are connected to first input ends of the corresponding second comparators 132. Output ends of the plurality of second comparators 132 are connected to input ends 21*a* of the corresponding first amplifiers 21. Second input ends of the plurality of second comparators 132 are configured to input the first digital electrical signal. Each digital signal generation circuit 121 of the plurality of digital signal generation circuits 121 is configured to generate one second digital electrical signal. Phases of a plurality of second digital electrical signals generated by the plurality of digital signal generation circuits 121 are different. Each second comparator 132 of the plurality of second comparators 132 is configured to output a target electrical signal based on an input second digital electrical signal and the first digital electrical signal, to obtain the plurality of target electrical signals with the different phases.

For example, the multiphase digital modulation circuit 13 may be a field-programmable gate array (FPGA), or may be an application-specific integrated circuit (ASIC), or certainly, may be another possible circuit.

It should be noted that the first comparators are configured to generate the target electrical signals based on waveforms of the continuous first analog electrical signal and the second analog electrical signals, and the second comparators generate the target electrical signals based on the first digital electrical signal in a form of a discrete binary data string and the second digital electrical signals. In this case, binary data being 1 corresponds to a high electrical level, and binary data being 0 corresponds to a low electrical level. In this way, at a same horizontal-axis location, when the first digital electrical signal corresponds to a high electrical level and the second digital electrical signal corresponds to a low electrical level, a corresponding horizontal-axis location in the target electrical signal is of a high electrical level. When the first digital electrical signal corresponds to a low electrical level and the second digital electrical signal corresponds to a high electrical level, a corresponding horizontal-axis location in the target electrical signal is of a low electrical level.

It should be noted that, because the multiphase digital modulation circuit 13 may directly modulate the first digital electrical signal, the multiphase digital modulation circuit 13 can directly receive the first digital electrical signal, and perform multiphase modulation on the first digital electrical signal in the form of the discrete binary data string, to obtain the plurality of target electrical signals with the different phases. Because a process in which the multiphase digital modulation circuit 13 obtains the target electrical signals based on the first digital electrical signal is to process a digital electrical signal, the target electrical signals obtained through processing are also digital electrical signals in the form of the discrete binary data string.

In one embodiment, based on the same reason described above, a quantity of the plurality of output ends 13*b* of the multiphase digital modulation circuit 13 may be different from a quantity of the plurality of first amplifiers 21 included in the amplifier array 2. In this case, the plurality of output ends 13*b* of the multiphase digital modulation circuit 13 may be connected to an input end 21*a* of a same first amplifier 21.

Figure 8:
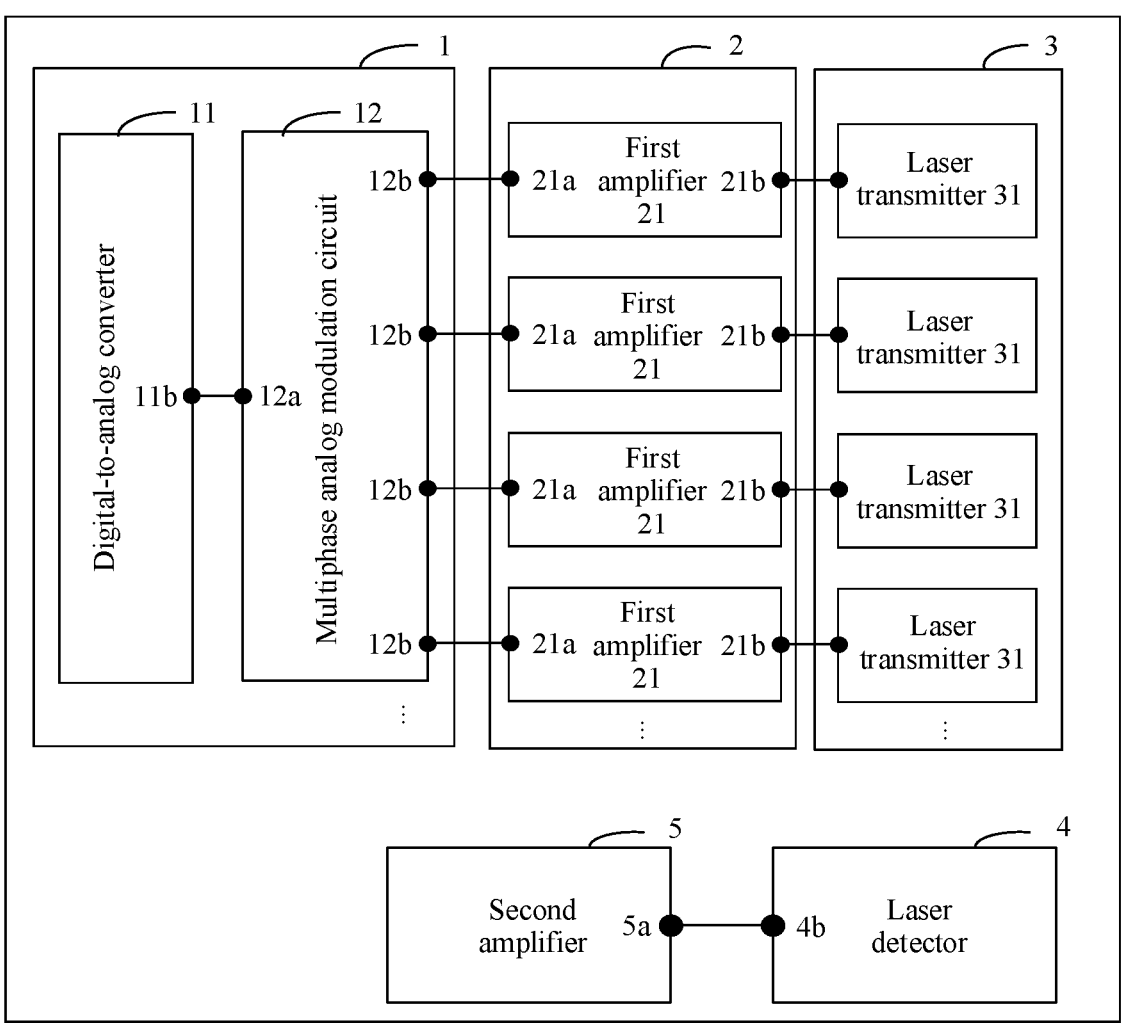
FIG. 8 is a schematic diagram of a structure of a fourth-type laser detection apparatus according to an embodiment of this application.
Figure 9:
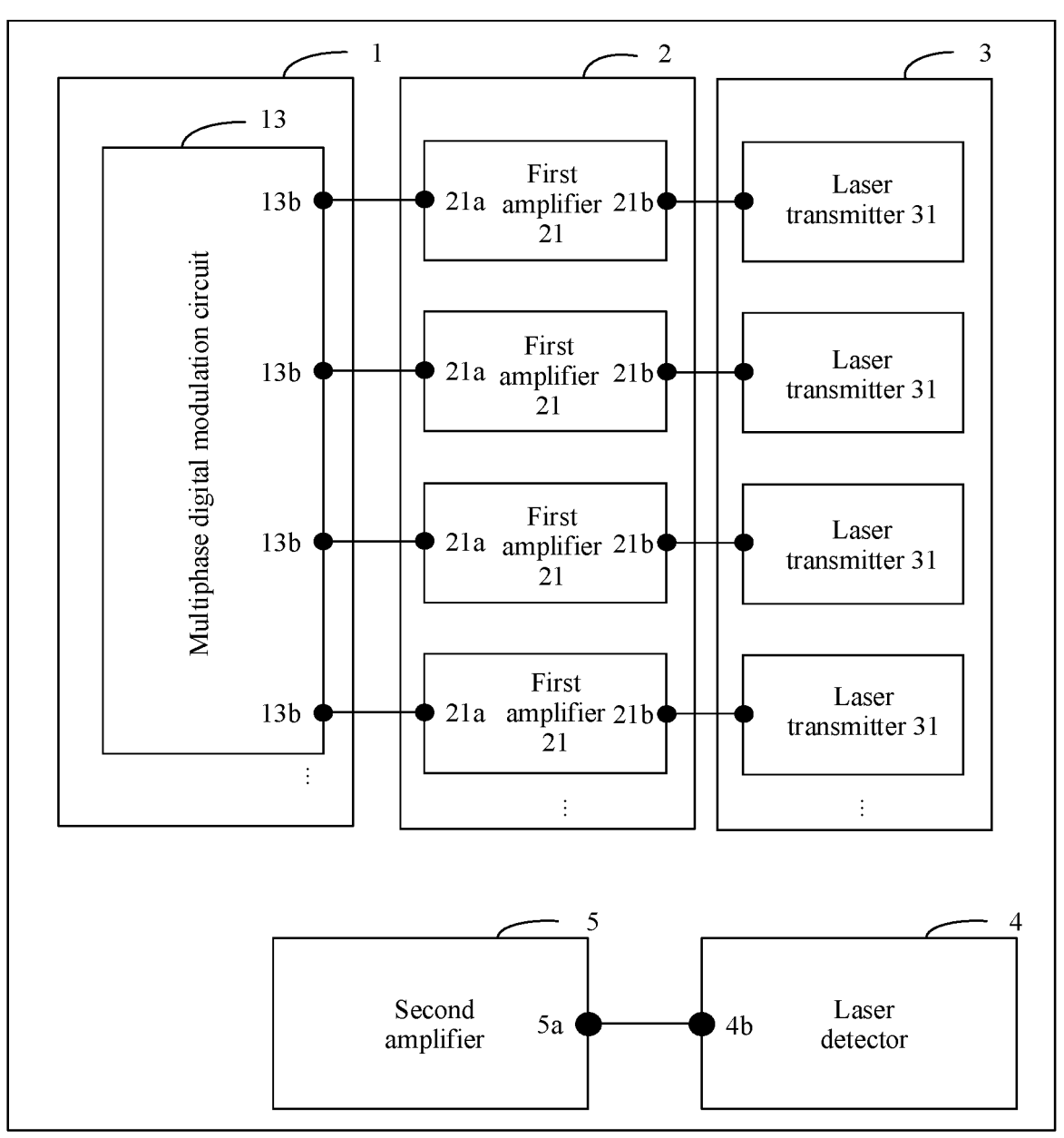
FIG. 9 is a schematic diagram of a structure of a fifth-type laser detection apparatus according to an embodiment of this application.

In some embodiments, as shown in FIG. 8 and FIG. 9, the laser detection apparatus may further include a laser detector 4 and a second amplifier 5. An output end 4*b* of the laser detector 4 is connected to an input end 5*a* of the second amplifier 5. The laser detector 4 is configured to: detect a second laser signal, convert the second laser signal into a third analog electrical signal, and output the third analog electrical signal to the second amplifier 5. The second amplifier 5 may receive the third analog electrical signal output by the laser detector 4, then may amplify power of the third analog electrical signal, and output an amplified third analog electrical signal to an analog-to-digital converter 6.

It should be noted that, after each laser transmitter 31 included in the laser transmitter array 3 separately transmits a first laser signal, the plurality of laser transmitters 31 transmit a plurality of first laser signals in total. Due to an aggregation feature of light, after encountering an object, the plurality of first laser signals are aggregated to form a second laser signal. Then, the laser detector 4 can detect the second laser signal, and convert the second laser signal into the third analog electrical signal.

Figure 10:
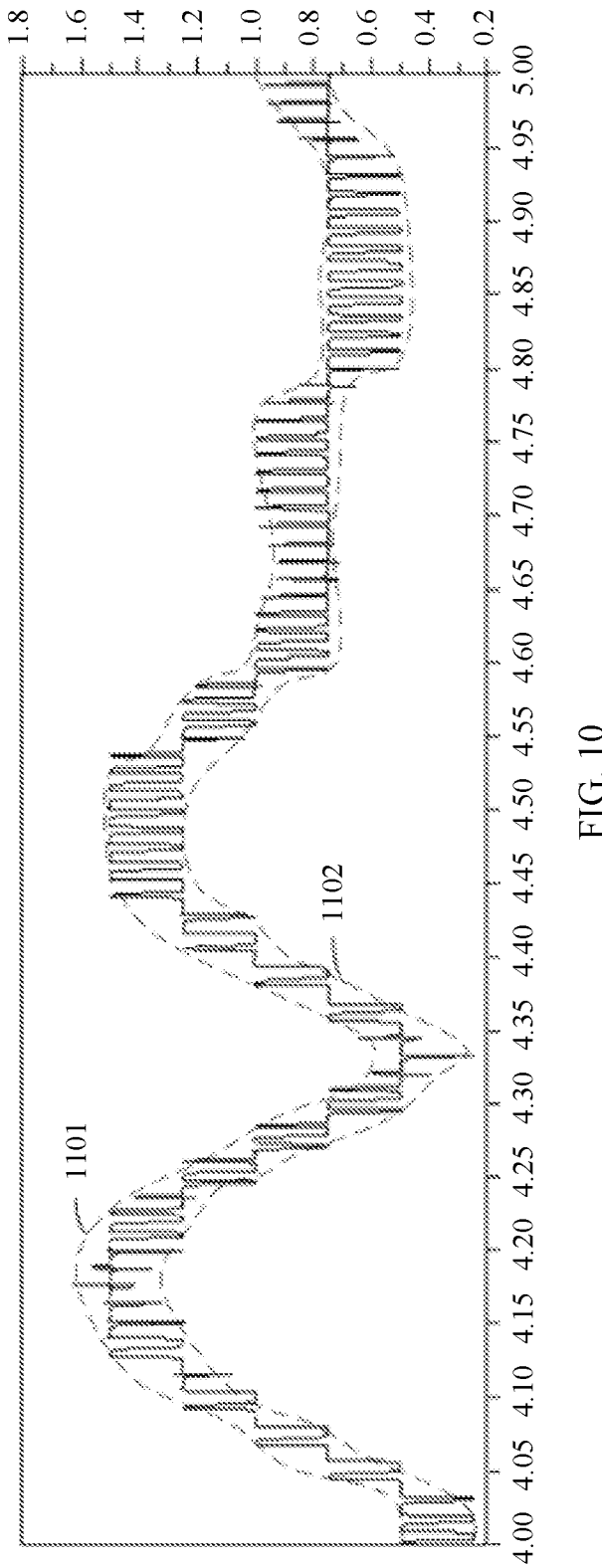
FIG. 10 is a schematic diagram of a second laser signal according to an embodiment of this application.

For example, the second laser signal detected by the laser detector may be a laser signal shown in FIG. 10, and an envelope of the second laser signal is between a curve 1101 and a curve 1102.

It should be noted that, because the second amplifier 5 connected to the laser detector 4 is configured to amplify power of an analog electrical signal, the laser detector 4 can convert the second laser signal into the third analog electrical signal after detecting the second laser signal, so that the analog-to-digital converter 5 can amplify the power of the third analog electrical signal.

In one embodiment, detection bandwidth of the laser detector 4 may be greater than transmit bandwidth of the target electrical signal. In this way, an original signal can be restored from the second laser signal detected by the laser detector 4. For example, the detection bandwidth of the laser detector may be 2 to 5 times the transmit bandwidth of the target electrical signal.

In one embodiment, the second amplifier 5 has particular signal passing bandwidth. The signal passing bandwidth refers to bandwidth of an analog electrical signal that can be transmitted by using the second amplifier 5 and whose power can be amplified by the second amplifier 5. In other words, only an analog electrical signal within the signal passing bandwidth can be transmitted by using the second amplifier 5, and the second amplifier 5 may perform power amplification on the analog electrical signal within the signal passing bandwidth. In this way, the original signal may be restored after the second amplifier 5 amplifies the power of the third analog electrical signal. For example, the signal passing bandwidth of the second amplifier 5 may be 2 to 5 times the transmit bandwidth of the target electrical signal.

In this embodiment of this application, although the first laser signals transmitted by the laser transmitters have high-speed pulse waveforms, envelope bandwidth of the second laser signal received by the laser detector is not high. Therefore, difficulty in converting the second laser signal into the third analog electrical signal by the laser detector is reduced.

Figure 11:
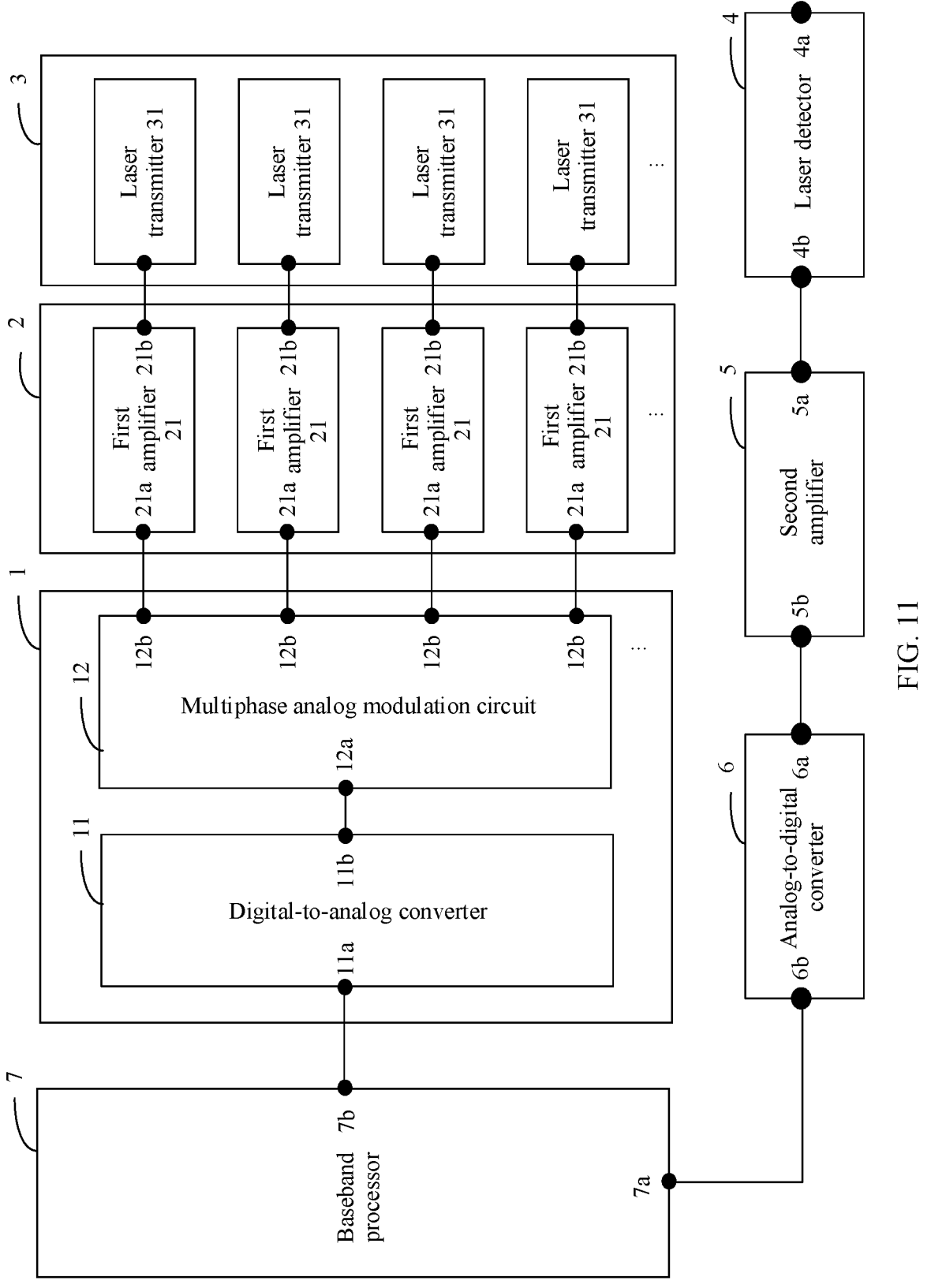
FIG. 11 is a schematic diagram of a structure of a sixth-type laser detection apparatus according to an embodiment of this application.
Figure 12:
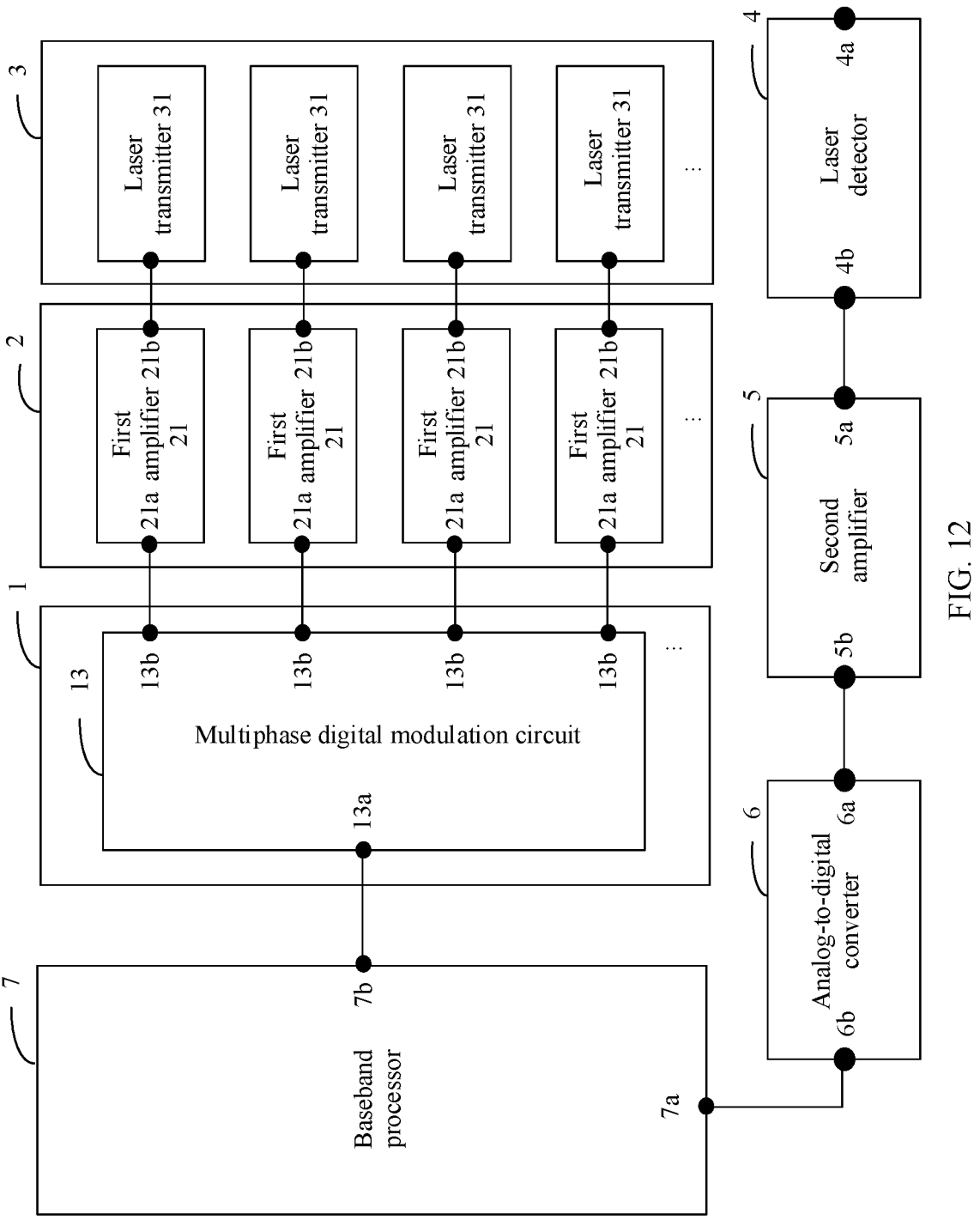
FIG. 12 is a schematic diagram of a structure of a seventh-type laser detection apparatus according to an embodiment of this application.

In some embodiments, as shown in FIG. 11 and FIG. 12, the laser detection apparatus may further include the analog-to-digital converter 6 and a baseband processor 7. An input end 6*a* of the analog-to-digital converter 6 is connected to an output end 5*b* of the second amplifier 5. An output end 6*b* of the analog-to-digital converter 6 is connected to an input end 7*a* of the baseband processor 7. An output end 7*b* of the baseband processor 7 is connected to an input end 1*a* of the multiphase signal generation circuit 1. The analog-to-digital converter 6 is configured to convert the third analog electrical signal into a third digital electrical signal, and output the third digital electrical signal to the baseband processor 7. The baseband processor 7 is configured to generate the first digital electrical signal, and output the first digital electrical signal to the multiphase signal generation circuit 1. The baseband processor 7 is further configured to detect a distance based on the first digital electrical signal and the third digital electrical signal.

It should be noted that the baseband processor 7 cannot directly process a continuous analog electrical signal, but can process only a digital electrical signal in a form of a discrete binary data string. Therefore, the analog-to-digital converter 6 needs to discretize the third analog electrical signal into the third digital electrical signal, and then output the third digital electrical signal to the baseband processor 7.

In an example, the baseband processor 7 may obtain a moment at which the first digital electrical signal starts to be output and a moment at which the third digital electrical signal starts to be received, and determine a first time difference between the two moments. Duration within which the multiphase signal generation circuit 1 generates the plurality of target electrical signals through modulation, duration within which the amplifier array 2 amplifies the plurality of target electrical signals, duration within which the plurality of target electrical signals drive the transmitter array 3 to transmit the first laser signals, duration within which the laser detector 4 converts the second laser signal into the third analog electrical signal, duration within which the second amplifier 5 amplifies the third analog electrical signal, and duration within which the analog-to-digital converter 6 converts the third analog electrical signal into the third digital electrical signal are constant. Therefore, the baseband processor 7 may subtract the constant duration, that is consumed by the processing by these circuits, from the first time difference. In this way, a second time difference between a moment at which the first laser signals are transmitted by the laser transmitters and a moment at which the first laser signals are received by the laser detector can be obtained. Then, the baseband processor 7 can determine a distance between the laser detection apparatus and the object based on the second time difference.

It should be noted that the baseband processor 7 may further demodulate the received third digital electrical signal. Because the first digital electrical signal and the third digital electrical signal are coherent signals, when demodulating the third digital electrical signal, the baseband processor 7 can obtain a coherent carrier based on the first digital electrical signal, and perform coherent demodulation on the third digital electrical signal based on the coherent carrier. In this way, a coherent gain can be obtained, to improve anti-interference performance and improve accuracy of a detected distance. The coherent signals are signals that have a same vibration direction, a same frequency, and a same phase or phase difference.

Figure 13:
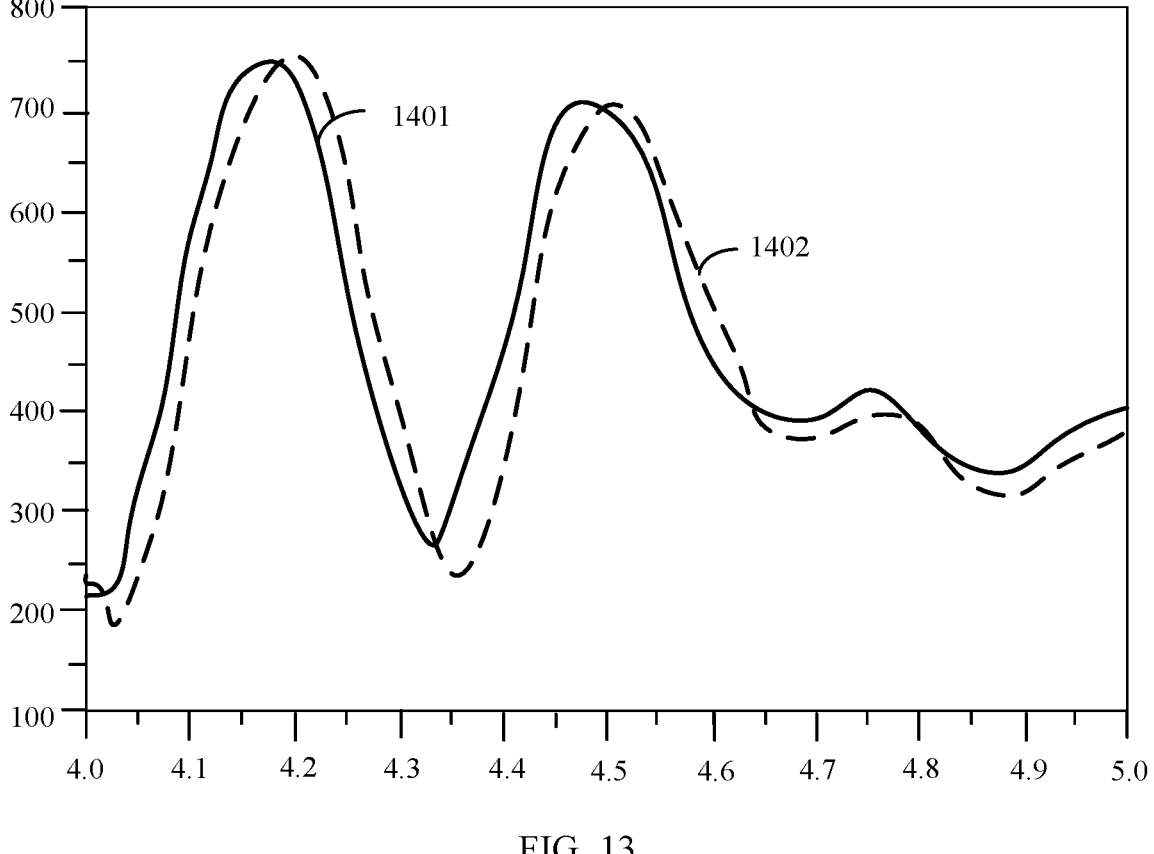
FIG. 13 is a schematic diagram of waveforms of a first digital signal and a third digital signal according to an embodiment of this application.

For example, as shown in FIG. 13, a coherent carrier may be obtained based on a first digital electrical signal 1401, and the baseband processor may demodulate a third digital electrical signal 1402 based on the coherent carrier, and may obtain a coherent gain.

In one embodiment, the laser detection apparatus may further include a low-pass filter. The low-pass filter may be connected in series between the laser detector 4 and the second amplifier 5, or be connected in series between the second amplifier 5 and the analog-to-digital converter 6.

It should be noted that, because the nature includes various interfering signals, the second laser signal may be interfered in the nature. Consequently, the second laser signal detected by the laser detector includes an interfering signal, and the third analog electrical signal converted based on the second laser signal also includes the interfering signal. To enable the baseband processor 7 to obtain a more accurate third digital electrical signal, before the third digital electrical signal is input into the baseband processor 7, the third digital electrical signal or the third analog electrical signal may be filtered, to filter out an interfering signal included in the third digital electrical signal or the third analog electrical signal. The low-pass filter may be any filter that can be configured to filter out the interfering signal included in the third analog electrical signal or the third digital electrical signal. This is not limited in this embodiment of this application.

Figure 14:
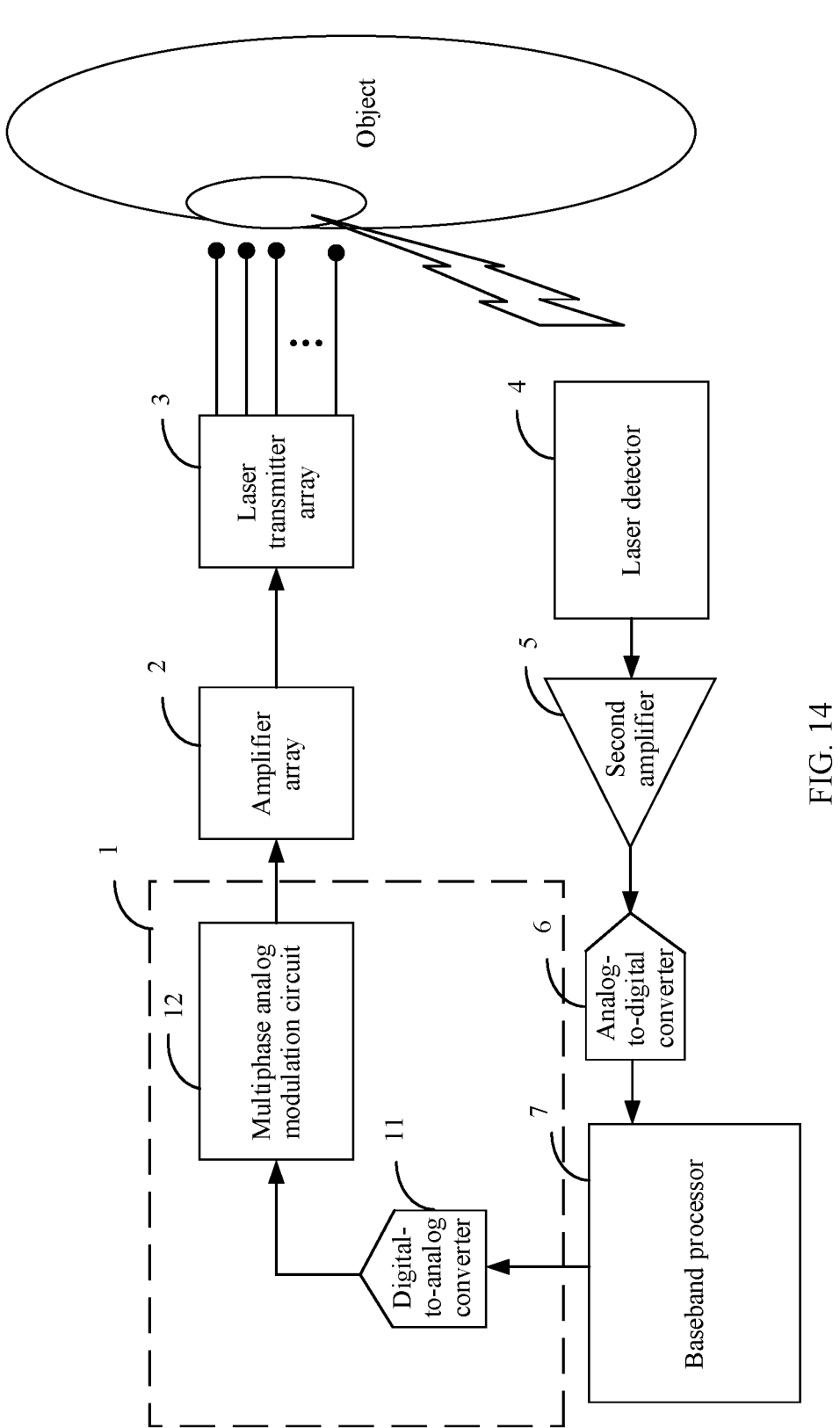
FIG. 14 is a schematic diagram of a structure of an eighth-type laser detection apparatus according to an embodiment of this application.

FIG. 14 shows an example laser detection apparatus according to an embodiment of this application. The following provides a complete description for this embodiment of this application based on FIG. 14.

The laser detection apparatus shown in FIG. 14 includes the multiphase signal generation circuit 1, the amplifier array 2, the laser transmitter array 3, the laser detector 4, the second amplifier 5, the analog-to-digital converter 6, and the baseband processor 7. The multiphase signal generation circuit 1 includes the digital-to-analog converter 11 and the multiphase analog modulation circuit 12. The multiphase analog modulation circuit 12 includes the plurality of output ends corresponding to the plurality of first amplifiers. The multiphase analog modulation circuit 12 includes the plurality of analog signal generation circuits and the plurality of first comparators, and each first comparator includes two input ends. The amplifier array 2 includes the plurality of first amplifiers. The laser transmitter array 3 includes the plurality of laser transmitters.

The output end of the baseband processor 7 is connected to an input end of the digital-to-analog converter 11. The output end of the digital-to-analog converter 11 is connected to the second input ends of the plurality of first comparators included in the multiphase analog modulation circuit 12. The first input ends of the plurality of first comparators are connected to the output ends of the plurality of analog signal generation circuits. The output ends of the plurality of first comparators are connected to the input ends of the plurality of first amplifiers included in the amplifier array 2. The output ends of the plurality of first amplifiers included in the amplifier array 2 are connected to the input ends of the plurality of laser transmitters included in the laser transmitter array 3. The output end of the laser detector 4 is connected to the input end of the second amplifier 5. The output end of the second amplifier 5 is connected to the input end of the analog-to-digital converter 6. The output end of the analog-to-digital converter 6 is connected to the input end of the baseband processor 7.

The baseband processor 7 is configured to generate the first digital electrical signal, and output the first digital electrical signal to the digital-to-analog converter 11. The digital-to-analog converter 11 may convert the first digital electrical signal into the first analog electrical signal, and output the first analog electrical signal to the multiphase analog modulation circuit 12. The plurality of analog signal generation circuits included in the multiphase analog modulation circuit 12 may generate the plurality of second analog electrical signals, and the phases of the plurality of second analog electrical signals are different. A first input end of each first comparator of the plurality of first comparators is configured to receive a second analog electrical signal generated by the connected analog signal generation circuit, and a second input end of each first comparator of the plurality of first comparators is configured to receive the first analog electrical signal. Then, each first comparator may generate a target electrical signal based on the first analog electrical signal and the second analog electrical signal, and the phases of the target electrical signals generated by the plurality of first comparators are different. After the plurality of first amplifiers included in the amplifier array 2 amplify power of the received target electrical signals, power-amplified target electrical signals may drive the laser transmitters connected to the laser transmitter array 3 to transmit the first laser signals. After the plurality of laser transmitters all transmit the first laser signals, the plurality of first laser signals are aggregated into the second laser signal due to aggregation of light when encountering the object, and the second laser signal is reflected.

The laser detector 4 may detect the second laser signal, convert the second laser signal into the third analog electrical signal, and output the third analog electrical signal to the second amplifier 5. The second amplifier 5 may amplify the power of the third analog electrical signal. Then, the analog-to-digital converter 6 may convert an amplified third analog electrical signal into the third digital electrical signal, and output the third digital electrical signal to the baseband processor 7. The baseband processor 7 may demodulate the third digital electrical signal, and determine the distance between the laser detection apparatus and the object based on the first digital electrical signal and the third digital electrical signal.

It should be noted that the "connection" in this embodiment of this application may be a direct connection. In one embodiment, in another possible case, the connection may not be a direct connection, but may be implemented by using some components. This is not limited in this embodiment of this application.

In this application, because the multiphase signal generation circuit can generate the plurality of target electrical signals with the different phases, after the first amplifiers included in the amplifier array amplify the plurality of target electrical signals, the first laser signals transmitted by the laser transmitters included in the laser transmitter array based on the amplified target electrical signals have high anti-interference performance, to improve accuracy of a distance detected by the laser detection apparatus. In addition, the laser transmitter array includes the plurality of laser transmitters, the transmit power of each laser transmitter is low, and impact caused by a parasitic parameter of the laser transmitter is small. Therefore, the transmit pulse width can be reduced by transmitting the laser signals by using the laser transmitter array.

Figure 15:
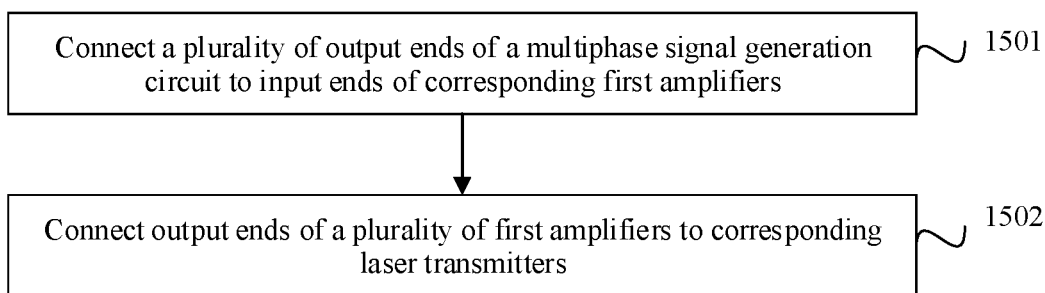
FIG. 15 is a flowchart of a method for manufacturing a laser detection apparatus according to an embodiment of this application.

FIG. 15 is a flowchart of a method for manufacturing a laser detection apparatus according to an embodiment of this application. The laser detection apparatus includes a multiphase signal generation circuit, an amplifier array, and a laser transmitter array. The amplifier array includes a plurality of first amplifiers. The laser transmitter array includes a plurality of laser transmitters. The plurality of first amplifiers correspond to the plurality of laser transmitters. The multiphase signal generation circuit includes a plurality of output ends corresponding to the plurality of first amplifiers. The multiphase signal generation circuit is configured to generate a plurality of target electrical signals with different phases, each of the plurality of first amplifiers is configured to amplify a target electrical signal output by the corresponding output end of the multiphase signal generation circuit, and each of the plurality of laser transmitters is configured to transmit a first laser signal based on a target electrical signal amplified by the corresponding first amplifier. As shown in FIG. 15, the method includes the following operations.

Operation 1501: Connect the plurality of output ends of the multiphase signal generation circuit to input ends of the corresponding first amplifiers.

In some embodiments, the multiphase signal generation circuit may include a digital-to-analog converter and a multiphase analog modulation circuit. The multiphase analog modulation circuit includes a plurality of output ends corresponding to the plurality of first amplifiers. In this case, an output end of the digital-to-analog converter may be connected to an input end of the multiphase analog modulation circuit, and the plurality of output ends of the multiphase analog modulation circuit may be connected to input ends of the corresponding first amplifiers. The digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

It should be noted that the multiphase analog modulation circuit may include a plurality of analog signal generation circuits and a plurality of first comparators. The plurality of analog signal generation circuits correspond to the plurality of first comparators, and the plurality of first comparators correspond to the plurality of first amplifiers. In this case, the output end of the digital-to-analog converter may be connected to second input ends of the plurality of first comparators, first input ends of the plurality of first comparators may be connected to output ends of the corresponding analog signal generation circuits, and output ends of the plurality of first comparators may be connected to input ends of the corresponding first amplifiers.

Each of the plurality of analog signal generation circuits is configured to generate a second analog electrical signal, and phases of a plurality of second analog electrical signals generated by the plurality of analog signal generation circuits are different. Each of the plurality of first comparators is configured to output a target electrical signal based on an input second analog electrical signal and the first analog electrical signal, to obtain the plurality of target electrical signals with the different phases.

In some other embodiments, the multiphase signal generation circuit includes a multiphase digital modulation circuit, and the multiphase digital modulation circuit includes a plurality of output ends corresponding to the plurality of first amplifiers. In this case, the plurality of output ends of the multiphase digital modulation circuit may be connected to input ends of the corresponding first amplifiers. The multiphase modulation circuit is configured to perform multiphase modulation on a first digital electrical signal, to obtain the plurality of target electrical signals with the different phases.

It should be noted that the multiphase digital modulation circuit includes a plurality of digital signal generation circuits and a plurality of second comparators. The plurality of digital signal generation circuits correspond to the plurality of second comparators, and the plurality of second comparators correspond to the plurality of first amplifier. In this case, output ends of the plurality of digital signal generation circuits may be connected to first input ends of the corresponding second comparators, and output ends of the plurality of second comparators may be connected to input ends of the corresponding first amplifiers.

Second input ends of the plurality of second comparators are configured to input the first digital electrical signal. Each of the plurality of digital signal generation circuits is configured to generate a second digital electrical signal, and phases of a plurality of second digital electrical signals generated by the plurality of digital signal generation circuits are different. Each of the plurality of second comparators is configured to output a target electrical signal based on an input second digital electrical signal and the first digital electrical signal, to obtain the plurality of target electrical signals with the different phases.

Operation 1502: Connect output ends of the plurality of first amplifiers to the corresponding laser transmitters.

In one embodiment, the laser detection apparatus may further include a laser detector and a second amplifier. In this case, an output end of the laser detector may be connected to an input end of the second amplifier. The laser detector is configured to: detect a second laser signal, convert the second laser signal into a third analog electrical signal, and output the third analog electrical signal to the second amplifier.

In one embodiment, the laser detection apparatus may further include an analog-to-digital converter and a baseband processor. In this case, an input end of the analog-to-digital converter may be connected to an output end of the second amplifier, an output end of the analog-to-digital converter may be connected to an input end of the baseband processor, and an output end of the baseband processor may be connected to an input end of the multiphase signal generation circuit. The analog-to-digital converter is configured to convert the third analog electrical signal into a third digital electrical signal, and output the third digital electrical signal to the baseband processor. The baseband processor is configured to generate a first digital electrical signal, and output the first digital electrical signal to the multiphase signal generation circuit, and is further configured to detect a distance based on the first digital electrical signal and the third digital electrical signal.

In one embodiment, the laser detection apparatus further includes a low-pass filter. In this case, the low-pass filter may be connected in series between the laser detector and the second amplifier, or the low-pass filter may be connected in series between the second amplifier and the analog-to-digital converter.

It should be noted that the "connection" in this embodiment of this application may be fusion welding, pressure welding, or brazing, or certainly, may be another method. For related explanation content, refer to the descriptions in the foregoing embodiments. Details are not described in this embodiment of this application again.

In this embodiment of this application, the multiphase signal generation circuit can generate the plurality of target electrical signals with the different phases. The plurality of target electrical signals are separately amplified by any first amplifier included in the amplifier array, and then may drive any laser transmitter included in the laser transmitter array to transmit the first laser signals. It can be seen that each laser transmitter needs to transmit only a part of power, to reduce a transmit pulse width. In addition, because the plurality of target electrical signals are electrical signals modulated by the multiphase signal generation circuit, the plurality of target electrical signals have specific feature information. In this way, the plurality of target electrical signals drive the laser transmitters to transmit the first laser signals, to improve anti-interference performance of the first laser signals, so as to improve accuracy of a distance detected by the laser detection apparatus.

An embodiment of this application further provides a sensor system. The sensor system includes one or more of the foregoing laser detection apparatuses. In one embodiment, the sensor system may further include one or more of a millimeter-wave radar, a camera apparatus, and the like. There may be one or more millimeter-wave radars, and there may be also one or more camera apparatuses.

An embodiment of this application further provides a vehicle. The vehicle carries the foregoing sensor system. In one embodiment, the vehicle may further include a braking system, a control system, and the like. The sensor system is used to detect a distance between the vehicle and another object. The control system is used to send a control instruction based on the distance detected by the sensor system. The braking system is used to execute the control instruction sent by the control system.

An embodiment of this application further provides an uncrewed aerial vehicle device. The uncrewed aerial vehicle device carries the foregoing sensor system. In one embodiment, the uncrewed aerial vehicle device may further include a braking system, a control system, and the like. The sensor system is used to detect a distance between the uncrewed aerial vehicle device and another object. The control system is used to send a control instruction based on the distance detected by the sensor system. The braking system is used to execute the control instruction sent by the control system.

The foregoing descriptions are embodiments provided in this application, but are not intended to limit this application. Any modification, equivalent replacement, or improvement made without departing from the spirit and principle of this application should fall within the protection scope of this application.

What is claimed is:

1. A laser detection apparatus comprising:

a multiphase signal generation circuit comprising a plurality of comparators configured to output a plurality of target electrical signals with different phases;

an amplifier array; and a laser transmitter array, wherein, the amplifier array comprises a plurality of first amplifiers respectively connected to the plurality of comparators and configured to amplify the plurality of target electrical signals, the laser transmitter array comprises a plurality of laser transmitters driven by the plurality of target electrical signals, the multiphase signal generation circuit comprises a plurality of output ends corresponding to the plurality of first amplifiers, the plurality of output ends of the multiphase signal generation circuit are connected to input ends of the corresponding first amplifiers, output ends of the plurality of first amplifiers are connected to the corresponding laser transmitters, and each of the plurality of laser transmitters is configured to transmit a first laser signal based on a target electrical signal amplified by the corresponding first amplifier.

2. The laser detection apparatus according to claim 1, wherein, the multiphase signal generation circuit comprises a digital-to-analog converter and a multiphase analog modulation circuit, and the multiphase analog modulation circuit comprises a plurality of output ends corresponding to the plurality of first amplifiers; and an output end of the digital-to-analog converter is connected to an input end of the multiphase analog modulation circuit, the plurality of output ends of the multiphase analog modulation circuit are connected to input ends of the corresponding first amplifiers, the digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

3. The laser detection apparatus according to claim 2, wherein, the multiphase analog modulation circuit comprises a plurality of analog signal generation circuits and the plurality of comparators, the plurality of analog signal generation circuits correspond to the plurality of comparators, the plurality of first comparators correspond to the plurality of first amplifiers, output ends of the plurality of analog signal generation circuits are respectively connected to first input ends of the plurality of comparators, second input ends of the plurality of comparators are connected to the output end of the digital-to-analog converter, output ends of the plurality of comparators are respectively connected to input ends of the plurality of first amplifiers, each of the plurality of analog signal generation circuits is configured to generate a second analog electrical signal, phases of a plurality of second analog electrical signals generated by the plurality of analog signal generation circuits are different, and each of the plurality of first comparators is configured to output a target electrical signal based on an input second analog electrical signal and the first analog electrical signal, to obtain the plurality of target electrical signals with the different phases.

4. The laser detection apparatus according to claim 1, wherein, the multiphase signal generation circuit comprises a multiphase digital modulation circuit, the multiphase digital modulation circuit comprises a plurality of output ends corresponding to the plurality of first amplifiers, the plurality of output ends of the multiphase digital modulation circuit are connected to input ends of the corresponding first amplifiers, and the multiphase digital modulation circuit is configured to perform multiphase modulation on a first digital electrical signal, to obtain the plurality of target electrical signals with the different phases.

5. The laser detection apparatus according to claim 4, wherein, the multiphase digital modulation circuit comprises a plurality of digital signal generation circuits and the plurality of comparators, the plurality of digital signal generation circuits correspond to the plurality of comparators, and the plurality of comparators correspond to the plurality of first amplifiers, output ends of the plurality of digital signal generation circuits are respectively connected to first input ends of the corresponding comparators, output ends of the plurality of comparators are respectively connected to input ends of the corresponding first amplifiers, second input ends of the plurality of comparators are configured to input the first digital electrical signal, each of the plurality of digital signal generation circuits is configured to generate a second digital electrical signal, phases of a plurality of second digital electrical signals generated by the plurality of digital signal generation circuits are different, and each of the plurality of comparators is configured to output a target electrical signal based on an input second digital electrical signal and the first digital electrical signal, to obtain the plurality of target electrical signals with the different phases.

6. The laser detection apparatus according to claim 1, wherein, the laser detection apparatus further comprises a laser detector and a second amplifier; and an output end of the laser detector is connected to an input end of the second amplifier, and the laser detector is configured to: detect a second laser signal, convert the second laser signal into a third analog electrical signal, and output the third analog electrical signal to the second amplifier.

7. The laser detection apparatus according to claim 6, wherein, the laser detection apparatus further comprises an analog-to-digital converter and a baseband processor; and an input end of the analog-to-digital converter is connected to an output end of the second amplifier, an output end of the analog-to-digital converter is connected to an input end of the baseband processor, an output end of the baseband processor is connected to an input end of the multiphase signal generation circuit, the analog-to-digital converter is configured to convert the third analog electrical signal into a third digital electrical signal, and output the third digital electrical signal to the baseband processor, and the baseband processor is configured to generate a first digital electrical signal, and output the first digital electrical signal to the multiphase signal generation circuit, and the baseband processor is further configured to detect a distance based on the first digital electrical signal and the third digital electrical signal.

8. The laser detection apparatus according to claim 7, wherein, the laser detection apparatus further comprises a low-pass filter; and the low-pass filter is connected in series between the laser detector and the second amplifier or is connected in series between the second amplifier and the analog-to-digital converter.

9. A method for manufacturing a laser detection apparatus, wherein the laser detection apparatus comprises a multiphase signal generation circuit comprising a plurality of comparators configured to output a plurality of target electrical signals with different phases, an amplifier array, and a laser transmitter array, the amplifier array comprises a plurality of first amplifiers configured to amplify the plurality of target electrical signals, the laser transmitter array comprises a plurality of laser transmitters, the plurality of first amplifiers correspond to the plurality of laser transmitters, and the multiphase signal generation circuit comprises a plurality of output ends corresponding to the plurality of first amplifiers, the method comprising:

connecting output ends of the plurality of comparators to input ends of the plurality of first amplifiers; and connecting output ends of the plurality of first amplifiers to the corresponding laser transmitters, wherein each of the plurality of first amplifiers is configured to amplify a target electrical signal output by the corresponding output end of the multiphase signal generation circuit, and each of the plurality of laser transmitters is configured to transmit a first laser signal based on a target electrical signal amplified by the corresponding first amplifier.

10. The method according to claim 9, wherein, the multiphase signal generation circuit comprises a digital-to-analog converter and a multiphase analog modulation circuit, and the multiphase analog modulation circuit comprises a plurality of output ends corresponding to the plurality of first amplifiers; and the method further comprises:

connecting an output end of the digital-to-analog converter to an input end of the multiphase analog modulation circuit; and connecting the plurality of output ends of the multiphase analog modulation circuit to input ends of the corresponding first amplifiers, wherein the digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

11. The method according to claim 10, wherein, the multiphase analog modulation circuit comprises a plurality of analog signal generation circuits and the plurality of comparators, the plurality of analog signal generation circuits correspond to the plurality of comparators, and the plurality of comparators correspond to the plurality of first amplifiers;

the method further comprises:

connecting the output end of the digital-to-analog converter to second input ends of the plurality of first comparators; and connecting first input ends of the plurality of first comparators to output ends of the corresponding analog signal generation circuits; and connecting output ends of the plurality of comparators to input ends of the corresponding first amplifiers, wherein, each of the plurality of analog signal generation circuits is configured to generate a second analog electrical signal, phases of a plurality of second analog electrical signals generated by the plurality of analog signal generation circuits are different, and each of the plurality of first comparators is configured to output a target electrical signal based on an input second analog electrical signal and the first analog electrical signal, to obtain the plurality of target electrical signals with the different phases.

12. The method according to claim 9, wherein, the multiphase signal generation circuit comprises a multiphase digital modulation circuit, and the multiphase digital modulation circuit comprises a plurality of output ends corresponding to the plurality of first amplifiers; and the method further comprises:

connecting the plurality of output ends of the multiphase digital modulation circuit to input ends of the corresponding amplifiers, wherein, the multiphase digital modulation circuit is configured to perform multiphase modulation on a first digital electrical signal, to obtain the plurality of target electrical signals with the different phases.

13. The method according to claim 12, wherein, the multiphase digital modulation circuit comprises a plurality of digital signal generation circuits and the plurality of comparators, the plurality of digital signal generation circuits correspond to the plurality of comparators, and the plurality of comparators correspond to the plurality of first amplifiers; and the method further comprises:

connecting output ends of the plurality of digital signal generation circuits to first input ends of the corresponding comparators; and connecting output ends of the plurality of comparators to input ends of the corresponding first amplifiers, wherein, second input ends of the plurality of comparators are configured to input the first digital electrical signal, each of the plurality of digital signal generation circuits is configured to generate a second digital electrical signal, phases of a plurality of second digital electrical signals generated by the plurality of digital signal generation circuits are different, and each of the plurality of comparators is configured to output a target electrical signal based on an input second digital electrical signal and the first digital electrical signal, to obtain the plurality of target electrical signals with the different phases.

14. The method according to claim 9, wherein, the laser detection apparatus further comprises a laser detector and a second amplifier, and, the method further comprises:

connecting an output end of the laser detector to an input end of the second amplifier, wherein, the laser detector is configured to: detect a second laser signal, convert the second laser signal into a third analog electrical signal, and output the third analog electrical signal to the second amplifier.

15. The method according to claim 14, wherein, the laser detection apparatus further comprises an analog-to-digital converter and a baseband processor, and, the method further comprises:

connecting an input end of the analog-to-digital converter to an output end of the second amplifier;

connecting an output end of the analog-to-digital converter to an input end of the baseband processor; and connecting an output end of the baseband processor to an input end of the multiphase signal generation circuit, wherein, the analog-to-digital converter is configured to convert the third analog electrical signal into a third digital electrical signal, and output the third digital electrical signal to the baseband processor, and the baseband processor is configured to generate a first digital electrical signal, and output the first digital electrical signal to the multiphase signal generation circuit, and the baseband processor is further configured to detect a distance based on the first digital electrical signal and the third digital electrical signal.

16. The method according to claim 15, wherein, the laser detection apparatus further comprises a low-pass filter, and, the method further comprises:

connecting the low-pass filter in series between the laser detector and the second amplifier or connecting the low-pass filter in series between the second amplifier and the analog-to-digital converter.

17. A terminal comprising:

a laser detection apparatus, wherein, the laser detection apparatus comprises a multiphase signal generation circuit comprising a plurality of comparators configured to output a plurality of target electrical signals with different phases, an amplifier array, and a laser transmitter array, wherein the amplifier array comprises a plurality of first amplifiers respectively connected to the plurality of comparators and configured to amplify the plurality of target electrical signals, the laser transmitter array comprises a plurality of laser transmitters driven by the plurality of target electrical signals, the multiphase signal generation circuit comprises a plurality of output ends corresponding to the plurality of first amplifiers, the plurality of output ends of the multiphase signal generation circuit are connected to input ends of the corresponding first amplifiers, output ends of the plurality of first amplifiers are connected to the corresponding laser transmitters, and each of the plurality of laser transmitters is configured to transmit a first laser signal based on a target electrical signal amplified by the corresponding first amplifier.

18. The terminal according to claim 17, wherein, the multiphase signal generation circuit comprises a digital-to-analog converter and a multiphase analog modulation circuit, and the multiphase analog modulation circuit comprises a plurality of output ends corresponding to the plurality of first amplifiers; and an output end of the digital-to-analog converter is connected to an input end of the multiphase analog modulation circuit, the plurality of output ends of the multiphase analog modulation circuit are connected to input ends of the corresponding first amplifiers, the digital-to-analog converter is configured to convert a first digital electrical signal into a first analog electrical signal, and the multiphase analog modulation circuit is configured to perform multiphase modulation on the first analog electrical signal, to obtain the plurality of target electrical signals with the different phases.

19. The terminal according to claim 18, wherein, the multiphase analog modulation circuit comprises a plurality of analog signal generation circuits and the plurality of comparators, the plurality of analog signal generation circuits correspond to the plurality of comparators, the plurality of comparators correspond to the plurality of first amplifiers, output ends of the plurality of analog signal generation circuits are respectively connected to first input ends of the plurality of comparators, second input ends of the plurality of comparators are connected to the output end of the digital-to-analog converter, output ends of the plurality of comparators are respectively connected to input ends of the corresponding first amplifiers, each of the plurality of analog signal generation circuits is configured to generate a second analog electrical signal, phases of a plurality of second analog electrical signals generated by the plurality of analog signal generation circuits are different, and each of the plurality of first comparators is configured to output a target electrical signal based on an input second analog electrical signal and the first analog electrical signal, to obtain the plurality of target electrical signals with the different phases.

20. The terminal according to claim 17, wherein, the multiphase signal generation circuit comprises a multiphase digital modulation circuit, the multiphase digital modulation circuit comprises a plurality of output ends corresponding to the plurality of first amplifiers, the plurality of output ends of the multiphase digital modulation circuit are connected to input ends of the corresponding first amplifiers, and the multiphase digital modulation circuit is configured to perform multiphase modulation on a first digital electrical signal, to obtain the plurality of target electrical signals with the different phases.

* * * * *